United States Patent
Sridhar et al.

(10) Patent No.: US 10,275,203 B2
(45) Date of Patent: Apr. 30, 2019

(54) METHODS AND APPARATUS FOR ENHANCING ELECTRONIC PRESENTATIONS WITH LOCATION INFORMATION

(71) Applicant: Zoho Corporation Private Limited, Pleasanton, CA (US)

(72) Inventors: Bharath Sridhar, Cupertino, CA (US); Manikandan Vembu, Chennai (IN); Ramakrishna Raju Vegesna, San Jose, CA (US); Vijaykumar Rajendran, Chennai (IN); Rajendran Dandapani, Chennai (IN); Sridhar Vembu, Pleasanton, CA (US); Karthikeyan Jambulingam, Chennai (IN); Sudheer A. Grandhi, Pleasanton, CA (US)

(73) Assignee: Zoho Corporation Private Limited, Chennai (IN)

( * ) Notice: Subject to any disclaimer, the term of this patent is extended or adjusted under 35 U.S.C. 154(b) by 372 days.

(21) Appl. No.: 15/214,367

(22) Filed: Jul. 19, 2016

(65) Prior Publication Data

US 2016/0328204 A1 Nov. 10, 2016

Related U.S. Application Data

(63) Continuation of application No. 15/065,568, filed on Mar. 9, 2016.
(Continued)

(51) Int. Cl.
*G06F 17/00* (2019.01)
*G06F 17/30* (2006.01)
(Continued)

(52) U.S. Cl.
CPC .......... *G06F 3/1454* (2013.01); *G06F 3/0482* (2013.01); *G06F 3/04817* (2013.01); *G06F 3/04842* (2013.01); *G06F 3/04847* (2013.01); *G06F 17/241* (2013.01); *G09B 5/08* (2013.01); *G09G 5/14* (2013.01); *H04L 12/1822* (2013.01);
(Continued)

(58) Field of Classification Search
CPC ...... G06Q 10/10; G06Q 30/00; G06F 3/0481; G06F 17/30056
See application file for complete search history.

(56) References Cited

U.S. PATENT DOCUMENTS 7,058,891 B2 6/2006 O'Neal et al.
7,412,533 B1 8/2008 Johnson et al.
(Continued)

OTHER PUBLICATIONS

Ashdown et al., Robust Content-Dependent Photometric Projector Compensation, 2006.
(Continued)

*Primary Examiner* — Jordany Nunez
(74) *Attorney, Agent, or Firm* — Mark Guidotti; Mark Lauer; Silicon Edge Law Group LLC

(57) ABSTRACT

A system and method for communicating a multimedia presentation between a presenter and an audience is described. Services provided via a network facilitate the communication, and include real-time determination of remaining portions of a presentation responsive to "on the fly" presentation modifications, automated filtering and prioritization of audience feedback to a presenter, and integration with one or more customer data resources.

7 Claims, 14 Drawing Sheets

Related U.S. Application Data

(60) Provisional application No. 62/131,106, filed on Mar. 10, 2015, provisional application No. 62/194,752, filed on Jul. 20, 2015, provisional application No. 62/196,151, filed on Jul. 23, 2015, provisional application No. 62/305,898, filed on Mar. 9, 2016.

(51) Int. Cl.
| | |
|---|---|
| *G06F 3/048* | (2013.01) |
| *H04N 5/64* | (2006.01) |
| *G06F 3/14* | (2006.01) |
| *G09B 5/08* | (2006.01) |
| *G06F 3/0482* | (2013.01) |
| *G06F 3/0484* | (2013.01) |
| *G09G 5/14* | (2006.01) |
| *H04W 4/02* | (2018.01) |
| *G06F 3/0481* | (2013.01) |
| *G06F 17/24* | (2006.01) |
| *H04L 12/18* | (2006.01) |
| *H04L 29/06* | (2006.01) |
| *H04N 7/15* | (2006.01) |
| *G06F 3/16* | (2006.01) |
| *H04M 3/56* | (2006.01) |

(52) U.S. Cl.
CPC ........... *H04L 65/403* (2013.01); *H04N 7/152* (2013.01); *H04W 4/02* (2013.01); *G06F 3/165* (2013.01); *G09G 2340/0464* (2013.01); *G09G 2354/00* (2013.01); *G09G 2370/02* (2013.01); *G09G 2370/16* (2013.01); *H04M 3/567* (2013.01); *H04M 2250/12* (2013.01)

(56) References Cited

U.S. PATENT DOCUMENTS

| | | |
|---|---|---|
| 7,454,708 B2 | 11/2008 | O'Neal et al. |
| 7,680,895 B2 | 3/2010 | Perlow et al. |
| 7,698,368 B2 | 4/2010 | Muller et al. |
| 8,046,478 B1 | 10/2011 | Ogdon et al. |
| 2007/0061326 A1* | 3/2007 | Stading .............. H04N 7/17318 |
| 2010/0017216 A1 | 1/2010 | Chakra et al. |
| 2012/0023407 A1 | 1/2012 | Taylor |
| 2013/0080348 A1 | 3/2013 | Pantaliano |
| 2013/0227420 A1 | 8/2013 | Pasquero et al. |
| 2013/0246913 A1 | 9/2013 | McCormack et al. |
| 2014/0165087 A1 | 6/2014 | Smith et al. |
| 2014/0172822 A1 | 6/2014 | Miller et al. |
| 2014/0310645 A1* | 10/2014 | Hunt .................... G06F 3/0481 715/784 |
| 2014/0344702 A1* | 11/2014 | Edge .................. G06Q 10/1091 715/730 |

OTHER PUBLICATIONS

Okamoto et al., Back-Review Support Method for Presentation Rehearsal Support System, 15th International Conference, KES 2011, Kaiserslautern, German, Sep. 12-14, 2011, Proceedings, Part II, pp. 165-166 (excerpt).

Edge et al., Hyperslides: Dynamic Presentation Prototyping, CHI 2013, Apr. 27-May 2, 2013, Paris, France.

Trinh et al., PitchPerfect: Integrated Rehearsal Environment for Structured Presentation Preparation, CHI 2014, Apr. 26-May 1, 2014, T oronto, ON, Canada.

Hachman, Exclusive: Zoho's Showtime app battles boring presentations, PCWorld, Sep. 22, 2014 (web page printout).

Unknown, GoToMeeting Integration Services APIs, Citrix Online LLC, Nov. 2, 2011.

Chiasson et al., Design Principles for Children's Technology, Dept. of Computer Science, University of Saskatchewan, HCI-TR-2005-02 (2005).

Bray, How Location-Based Apps Will Shape the Future of Shopping, Discover Magazine, Apr. 30, 2014 (web page printout).

Kurihara et al., Presentation Sensei: A Presentation Training System using Speech and Image Processing, ICMI '07 Proceedings of the 9th International Conference on Multimodal Interfaces, Nov. 12, 2007, pp. 358-365.

Nayer et al., A Projection System with Radiometric Compensation for Screen Imperfections, Dept. of Computer Science, Columbia University, New York, 2003.

Various, One day Multi-Track Conference with each track/session having a capacity cutoff, EventEspresso.com support blog, Dec. 27, 2012.

Unknown, PowerPoint 2013 Slide Master View, GCFLearnFree.org, 2013 (web page printout).

Grundhofer, Practical Non-linear Photometric Projector Compensation, 2003 IEEE Conference on Computer Vision and Pattern Recognition Workshops, Jun. 23-28, 2013, pp. 924-929.

Brown, Presentation Tools That Go Beyond "Next Slide Please", Harvard Business Review, Apr. 24, 2014 (web page printout).

Unknown, Presenter—for Show-TIme from Zoho, V1.0.2, iTunes Preview, Zoho Corporation, Dec. 3, 2014 (web page printout).

Unknown, Presenter for Zoho Showtime V1.0.1, Android Apps on Google Play, Zoho Corporation, Nov. 25, 2014 (web page printout).

Schettini et al., Contrast image correction method, Journal of Electronic Imaging 19(2), 1 (Apr.-Jun. 2010).

Unknown, View your speaker notes privately, while delivering a presentation on multiple monitors (applies to PowerPoint 2007, Office 2007), Microsoft Corporation (web page printout).

Unknown, Viewer—for ShowTIme from Zoho, V1.0.1, iTunes Preview, Zoho Corporation, Dec. 29, 2014 (web page printout).

Unknown, Viewer—for ShowTIme from Zoho, V1.0, Android Apps on Google Play, Zoho Corporation, Oct. 11, 2014 (web page printout).

Unknown, What is Presenter View? (applies to PowerPoint 2010), Microsoft Corporation (web page printout).

Final Rejection in U.S. Appl. No. 15/0065,568, dated Sep. 13, 2018, 25 pages.

* cited by examiner

300

```
┌─────────────────────────────────────────────────────────────────┐
│ Provide a presentation interface for a multimedia presentation  │
│ to a presentation device via a network 305                      │
└─────────────────────────────────────────────────────────────────┘
                                │
                                ▼
┌─────────────────────────────────────────────────────────────────┐
│ Provide a presenter interface for the multimedia presentation   │
│ to a wireless handheld presenter device via the network 310     │
└─────────────────────────────────────────────────────────────────┘
                                │
                                ▼
┌─────────────────────────────────────────────────────────────────┐
│ Send a portion of the multimedia presentation to the wireless   │
│ handheld presentation device via the network 315                │
└─────────────────────────────────────────────────────────────────┘
                                │
                                ▼
┌─────────────────────────────────────────────────────────────────┐
│ Send a portion of the multimedia presentation to the            │
│ presentation device via the network 320                         │
└─────────────────────────────────────────────────────────────────┘
                                │
                                ▼
┌─────────────────────────────────────────────────────────────────┐
│ Receive commands from the wireless handheld presentation        │
│ device via the network 330                                      │
└─────────────────────────────────────────────────────────────────┘
                                │
                                ▼
┌─────────────────────────────────────────────────────────────────┐
│ Update the portion of the multimedia presentation via the       │
│ network 335                                                     │
└─────────────────────────────────────────────────────────────────┘
                                │
                                ▼
┌─────────────────────────────────────────────────────────────────┐
│ Provide an audience interface for the multimedia presentation   │
│ to a wireless handheld audience device via the network 340      │
└─────────────────────────────────────────────────────────────────┘
                                │
                                ▼
┌─────────────────────────────────────────────────────────────────┐
│ Identify an audience member corresponding to the wireless       │
│ handheld audience device 345                                    │
└─────────────────────────────────────────────────────────────────┘
                                │
                                ▼
┌─────────────────────────────────────────────────────────────────┐
│ Retrieve, via the network, customer data corresponding to the   │
│ audience member 350                                             │
└─────────────────────────────────────────────────────────────────┘
                                │
                                ▼
                          ( Done 395 )
```

Fig. 3

# METHODS AND APPARATUS FOR ENHANCING ELECTRONIC PRESENTATIONS WITH LOCATION INFORMATION

FIELD OF THE INVENTION

The present disclosure relates generally to multimedia presentations, and more particularly to methods and systems for controlling presentation content, and facilitating audience participation. Augmenting a presentation with information from a third party resource, e.g., multimedia content, and a customer data resource, e.g., CRM, and real-time capture of information from an audience to, e.g., CRM or a third party resource, may further enhance the audience's experience during and after a multimedia presentation.

BACKGROUND

A live media presentation is an event at which a speaker—the presenter—uses speech and a display to inform, persuade, or build good will to attendant audience members located within view of the display. Live media presentations co-locate the presenter, display, and audience members, commonly in meeting rooms, conference halls, and classrooms.

Typically in presentations a presenter uses support services (e.g., presentation aids, tools for audience interaction) to enhance presentations. A simple example of a presentation aid is a pointer to direct audience attention to a particular location within the presentation. Such pointers traditionally have been dedicated peripheral devices to interact with the display, e.g., a telescoping pointer rod, an electronic mouse, and a laser pointer. Audience feedback is typically sought by the presenter using verbal interaction, but may also be unsolicited and include comments and general information. In addition, electronic systems provide a way for audience members to provide feedback via personal devices by communicating, e.g., over a network, back to the presenter, who is connected to the network via a device. The presenter may also send feedback requests to the personal devices of the audience over the network.

Presenting a multimedia presentation to an audience nevertheless presents real-time logistical challenges to the presenter. For example, interacting with an audience and entertaining feedback, e.g., questions and comments, inevitably affects presentation pacing and timing and, in the absence of effective moderation, can also be distracting to the presenter. Moreover, deviation from a rehearsed presentation may imperil the timing, flow, and integrity of the actual presentation—a disincentive to interact with an audience, thereby potentially stifling communication.

BRIEF DESCRIPTION OF THE DRAWINGS

The subject matter presented herein is illustrated by way of example, and not by way of limitation, in the figures of the accompanying drawings and in which like reference numerals refer to similar elements and in which:

FIG. 3 is a flowchart depicting a method for presenting a multimedia presentation in accordance with another embodiment;

DETAILED DESCRIPTION

Figure 1:
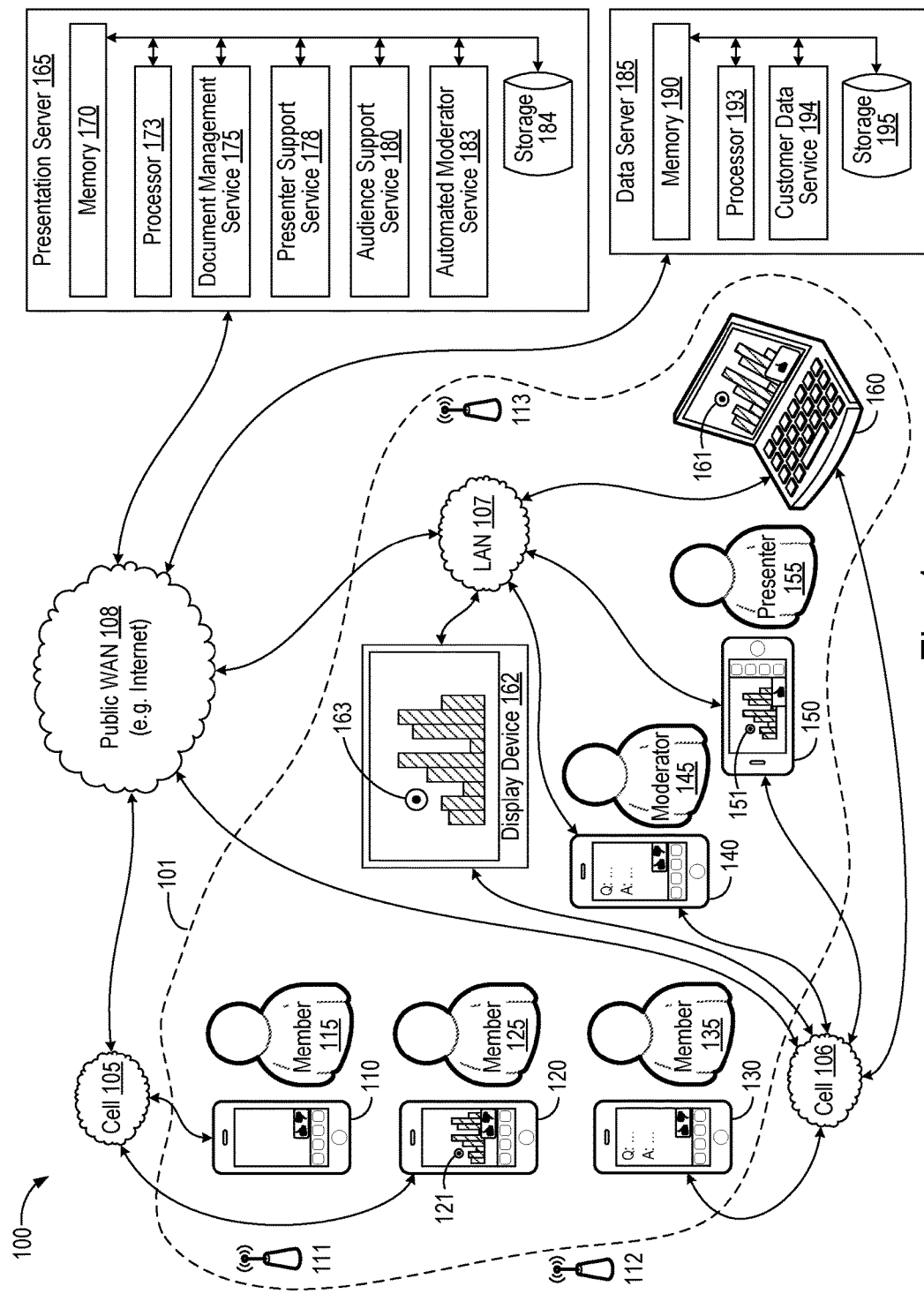
FIG. 1 depicts a computer-implemented system for presenting a multimedia presentation in accordance with one embodiment.

FIG. 1 depicts a computer-implemented system 100 for preparing and delivering a multimedia presentation in accordance with one embodiment. The presentation is delivered by a presenter 155 to an audience, e.g., members 115, 125, and 135 in a room 101 of a building, who view the presentation on a conventional display device 162, and on conventional wireless handheld devices 110, 120, and 130. In one embodiment, display device 162 is a wireless handheld device, e.g., similar to or the same as devices 110, 120, and 130. The presentation may include one or more portions, e.g., slides, video, and audio segments, arranged to achieve a desired pacing and flow. Each portion of the multimedia presentation may include a group of one or more slides. A remote server, e.g., presentation server 165 and data server 185 in one embodiment, includes presentation services 175, 178, 180, and 183, customer data service 194, which in some embodiments supports the presentation services, and storage, e.g., computer disks and databases, for creating, storing, rehearsing, and displaying the presentation. In one embodiment, customer data service 194, also referred to as a customer data resource, may be a customer relationship management system ("CRM"). In another embodiment, customer data service 194 may be a simple address book, a contacts database, or an application. In still another embodiment, customer data service 194 serves as a gateway for third party and other resources, e.g., resources provided by Zoho Corporation Pvt. Ltd., Chennai, India, and Zoho Corporation, Pleasanton, Calif., including without limitation, CRM, Sales IQ, Campaigns, Survey, Sites, Social, Contact Manager, Mail, Docs, Projects, Connect, Bug Tracker, Meeting, Vault, Showtime, Support, Assist, Books, Invoice, Subscriptions, Expense, Inventory, Recruit, People, Reports, and Creator, and, e.g., a third party CRM system. As will be seen, system 100 also gives the presenter real-time information relating to audience members, assists the presenter in making presentation changes during a presentation to, e.g., respond to audience feedback, e.g., Q&A, and rearrange the order and duration of presentation portions (informed by presentation history and customer data, e.g., customer relationship management "CRM" data). Customer data include "lead scoring" results in one embodiment, described in more detail below. System 100 adjusts the respective durations of presentation portions responsive to presentation changes to, e.g., maintain an overall presentation duration budget, and helps to avoid presenter "information overload" by automatically moderating audience feedback to the presenter.

System 100 also advantageously enables the presenter to, e.g., respond impromptu to topics relevant to an audience, and to rearrange the presentation as desired "on the fly" while preserving the pacing, duration, and integrity of the presentation as a whole. Moreover, metrics and other data relating to the presentation are saved for application to future preparations and presentations, thereby providing for continuous process improvement. For example, a particularly favored portion, e.g., one that is entertaining, informative, or tending to induce product interest, may be identified as such. System 100 enables identifying ("flagging" or "tagging") the favored portion in real-time. Identification may be performed manually, e.g., during the presentation, via e.g., an on-screen icon appearing on wireless handheld presenter devices 150 and 160. Identification may also be performed automatically, e.g., via heuristics analysis provided by presenter support service 178. Heuristics include correlating audience feedback, e.g., Q&A and comments with, e.g., CRM data and presentation portions to identify particularly favored portions. Applying heuristics advantageously identifies potentially important audience member interests after a presentation—in effect performing a forensics analysis on the proceedings—thereby providing powerful sales and marketing information to an organization. Audience service 178 captures audience feedback, e.g., textually as entered by a presenter or a moderator, or by, e.g., converting a recording of the presentation proceedings to a transcript. Similarly, a portion precipitating audience feedback indicating its message is, e.g., boring or unclear, may be identified for improvement. Similarly, follow-up and "to-do" items precipitated by audience feedback, including, e.g., product questions and sales leads, may be saved to customer (CRM) data, thereby enhancing an organization's sales and marketing processes.

Returning to FIG. 1, a display device 162, e.g., a presentation device such as a large flat screen television, a projection device, or a wireless handheld device, communicates with the remote server via a network, which may be a private network or a public network. As depicted in FIG. 1, display device 162 communicates with the remote server via public WAN 108, e.g., a public network such as the Internet, or a VPN tunnel over the Internet, and projects the multimedia presentation to the audience. Display 162 accesses public WAN 108 via a local area network, LAN 107, which may be wired or wireless as one of skill in the art would readily appreciate, or via a cellular network, e.g., cell 106. In another embodiment, a presentation interface for the multimedia presentation is provided to presentation device 162 via the network. A wireless handheld presenter device 150, e.g., an iPhone or iPad provided by Apple, Inc. of Cupertino, Calif., including, e.g., devices 810 and 860 depicted in FIG. 8, devices 950 and 1050 respectively depicted in FIGS. 9 and 10, and a wireless handheld device 160, e.g., a laptop computer provided by Dell, Inc. of Round Rock, Tex., also communicate with the remote server via public WAN 108. The devices access public WAN 108 via LAN 107 or a cellular network, e.g., cell 106. Other wireless handheld devices, e.g., iPhone or iPad, in room 101, include wireless handheld audience devices 110, 120, and 130, used respectively by audience members 115, 125, and 135, and wireless handheld moderator device 140 used by moderator 145. As with wireless device 150, these devices similarly communicate with the remote server via public WAN 108, LAN 107, cell 106, or via another cellular network, cell 105.

In the embodiment depicted in FIG. 1, the remote server includes presentation server 165 and data server 185. The remote server, sometimes referred to as an "application server," is typically "cloud based," that is, it is not co-located at the site of a presentation, e.g., room 101. It may be implemented in a distributed fashion, or co-located, as warranted by circumstances. Components depicted in servers 165 and 185 may alternatively be situated within a single server in another embodiment, or may be realized as individual servers, each providing one or more services in yet another embodiment. As depicted in FIG. 1, servers 165 and 185 include respectively memory 170 and 190, processor 173 and 193, and storage 184 and 195. A non-transitory computer-readable medium, e.g., memories 170 and 190, holds instructions for execution by a processor, e.g., processors 170 and 190. The instructions provide various interfaces for a multimedia presentation to various devices, e.g., a display device, and wireless handheld devices, via a network, as described below. The processors, memory, and storage may be realized within a single hardware server. Alternatively a server may be virtualized, e.g., VMWARE, and VIRTUALBOX, or distributed across various locations, e.g., "in the cloud," and intercommunicating with one another via a network.

Services 175, 178, 180, 183, and 194 included in the remote server facilitate creating and delivering multimedia presentations, including creating, rehearsing, adapting, rearranging, and viewing portions of a multimedia presentation. The services may also variously provide interfaces for various wireless handheld and other display devices via the network, such as flow control commands, viewing commands, updating commands, and synchronization commands. Presentation services also include associating customer data, including audience member feedback, with one or more portions of a multimedia presentation, and services relating to receiving and moderating feedback to presenter 155 from audience members, e.g., members 115, 125, and 135. Services typically intercommunicate via application programming interfaces ("API"), and may also communicate through other services, and communicate with various devices, e.g., desktop computers, laptop computers, and wireless handheld devices, via public WAN 108, and via local area networks, e.g., LAN 107. A service supporting a user interface, e.g., a mobile application or web client, may communicate with the client over a network. In general, software modules or applications may communicate with each other to exchange information or data. For example, information may be exchanged between software modules or applications using webhooks or API calls. When an update, change, or event occurs in an application, the application may provide via a webhook to other applications, e.g., delivered at a URL, one or more triggers, data, or changes to data, and information related to events or data changes. An API call may be made from one application to another to obtain data changes periodically, or on demand, e.g., triggered by a user to update customer data. In one embodiment, functions provided by individual services identified in FIG. 1 may be arbitrarily implemented and provided via a plurality of inter-communicating services. Functions provided by services identified in FIG. 1 may be implemented and provided by a single service in accordance with another embodiment. In another embodiment, one or more of services 175, 178, 180, 183, and 194, communicate with one or more systems, e.g., an in-house or outsourced customer relationship management ("CRM") system, and e.g., transmit and receive CRM data. For example, an outsourced CRM system communicates a notice, e.g., via a webhook, wherein the webhook provides updated or changed data upon the occurrence of any updated or changed data, to document management service 175 and audience support service 180, that its CRM data has changed. In response, audience support service 180 transmits an icon to the screen of wireless handheld presenter device 150 to alert presenter 155 of the change. Presenter 155 may activate the icon to view the CRM data on device 150. In another embodiment, activating the icon transmits the CRM data, for example a data sheet relating to a product of interest to an audience member who may be a potential customer, to presentation device 162, thereby including it in the presentation "on the fly." Document management service 175 responds to the change in another embodiment, communicates with the third party CRM to obtain the CRM data, and transmits the CRM data to the screen of a device in communication with document management service 175, e.g., device 160.

Figure 4:
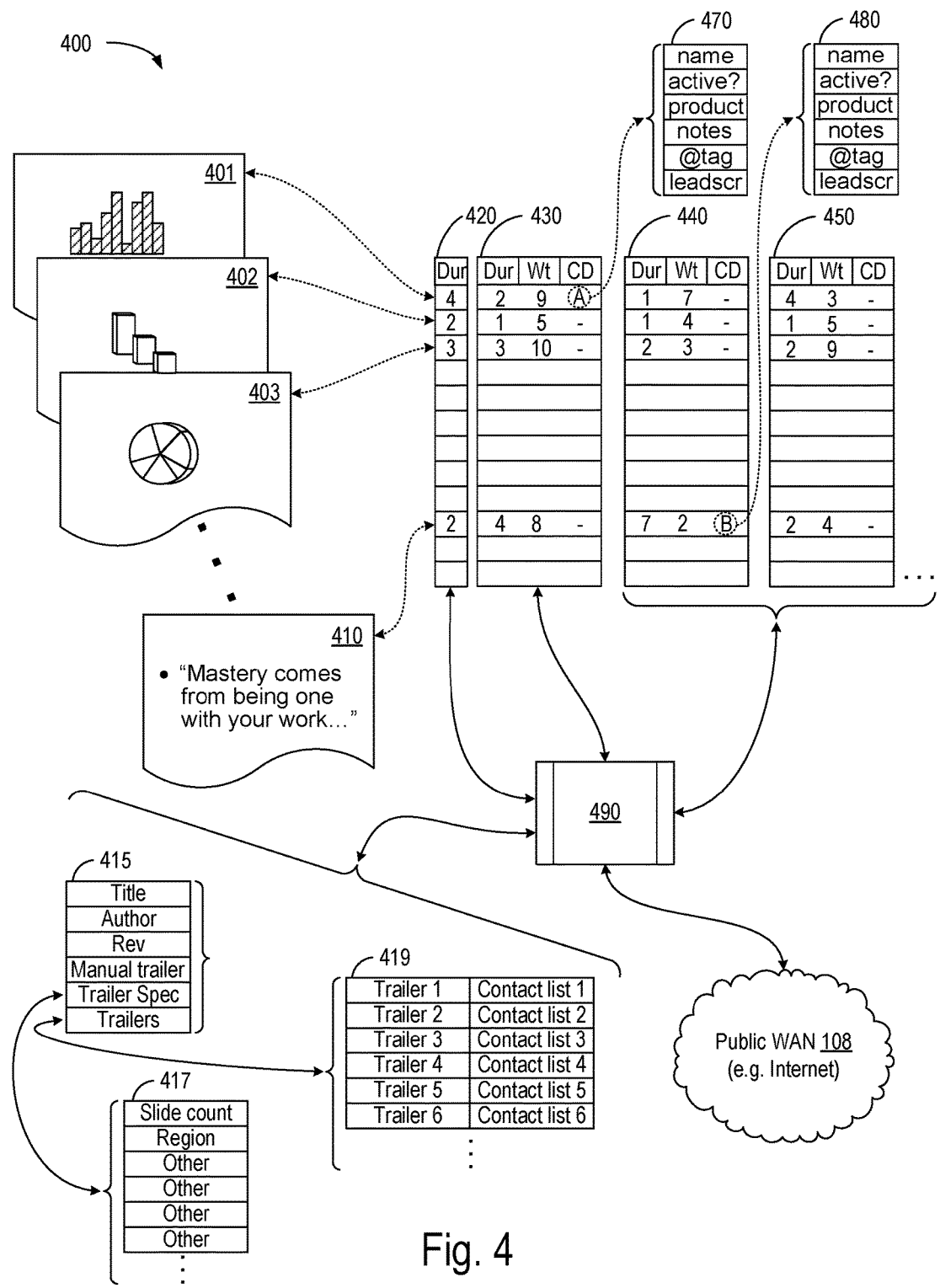
FIG. 4 depicts portions of a presentation and data tables relating to a multimedia presentation in accordance with one embodiment.

Document management service 175 provides a user interface for creating, modifying, and maintaining a multimedia presentation. In one embodiment, document management service 175 provides a presentation interface for the multimedia presentation to a presentation device, e.g., display device 162, via the network. In another embodiment, service 175 provides a presenter interface for the multimedia presentation to a wireless handheld presenter device, e.g., devices 150, 160, 810, and 860, via the network. A presentation may include audio, video, and slides, such as slides 401-410, and slides 701-710, depicted respectively in FIGS. 4 and 7. In one embodiment, the user interface is web-based, e.g., HTML is transmitted to a web browser; in another embodiment, the user interface is provided in a mobile application for execution on, e.g., Android, iOS, and Windows-based mobile devices. Document management service 175 maintains a data structure as depicted in FIG. 4 in one embodiment, associating a multimedia presentation with events and metrics relating to the presentation, e.g., portion durations, audience feedback, including historical data, e.g., events, metrics, and analytics.

Presenter support service 178 supports the presenter during a presentation. In one embodiment, presenter support service 178 provides a presentation interface for the multimedia presentation to the presentation device, e.g., display device 162, via the network. In another embodiment, service 178 provides a presenter interface for the multimedia presentation to a handheld wireless presenter device, e.g., devices 150, 160, 810, and 860, via the network. Through service 178, presenter 155 controls the movement and flow of the presentation, typically via a wireless handheld presenter device 150 running, e.g., a browser or application, thereby enabling presenter 155 to move about freely. Presenter 155 controls the movement and flow of the presentation e.g., via flow control commands, by selecting one or more portions to render to the display device 162, and to display to wireless handheld audience devices 110, 120, and 130. The presentation may be synchronized across devices, e.g., the same portion is displayed on each, or the presentation may be individualized such that each member, e.g., 115, 125, 135, views different portions of the presentation. Service 178, in conjunction with audience presentation service 180, enables presenter 155 to select a range of portions, e.g., slides, to deliver to wireless handheld audience devices 110, 120, and 130. For example, presenter 155 may determine, after reaching portion no. 10, to allow members 115, 125, and 135 to access, e.g., scroll through and view portions already presented, e.g., portions 1-9. Service 178 communicates the range through an API to document management service 175, which in turn communicates through an API to audience support service 180 (described more fully below). Presenter support service 178 and audience support service 180 communicate directly with one another in another embodiment. Service 180 thereafter delivers, or makes accessible, portions of the multimedia presentation already presented by the presenter to audience members, but not portions not yet presented.

An advantageous aspect of presenter support service 178 is an interactive electronic pointer. Presenter 155 communicates with audience members 115, 125, and 135 in a variety of ways. The presenter 155 may communicate verbally, or by displaying portions of the presentation on, e.g., devices 110, 120, and 130, display device 162, or by "pointing to" items on-screen, in the presentation itself. In one embodiment, presentation service 178 places an interactive electronic pointer within the presentation. In another embodiment, presentation service 178 enables the presenter to activate and place the interactive electronic pointer by, e.g., selecting an icon provided as a pointer, or by, e.g., tapping-and-holding on the screen of device 150. Display device 162 shows a pointer 163 situated above the second bar of an on-screen bar chart. Moving to a previous or subsequent presentation portion refreshes or resets the pointer. Wireless audience display device 120 shows the same bar chart seen on device 162, and includes pointer 121 synchronized to approximately the same relative location as pointer 163. So too for pointer 151 appearing on wireless handheld presenter device 150, and pointer 161 appearing on laptop 160. In another aspect, annotation and other tools enable presenter 155 to further communicate with an audience as described more fully with respect to FIG. 8 below.

In one embodiment, pointer 151 appears at a location. Pointer 151 is initiated by the presenter in another embodiment. On wireless handheld device 150, presenter 155 swipes pointer 151, causing it to move to a new pointer location. The application, or, e.g., a web client of presenter service 178, running on device 150, determines an updated position corresponding to the new pointer location, and transmits the updated position to presentation service 178. Service 178 in turn communicates the updated position via, e.g., an API, to audience support service 180, which synchronizes pointers 121, 161, and 163 respectively on handheld devices 120, 160, and display device 162, thereby reflecting the new pointer location. In another embodiment, presenter support service 178 additionally communicates the updated position to document management service 175 to synchronize the pointer corresponding to one or more devices communicating with document management service 175, e.g., pointers 161 and 163 respectively, of devices 160 and 162. In another embodiment, presenter 155 re-orients device 150 by, e.g., moving it about in space. The application running on device 150 reads position and accelerometer information from sensors in device 150, determines an updated pointer position, and communicates it to presentation server 178. As before, server 178 communicates the updated position to audience service 180, which in turn causes the wireless handheld devices in room 101, e.g., devices 110, 120, 130, 140, 150, 160, and display device 162, to reflect their respective new pointer locations. In another embodiment, server 178 also communicates the updated position to document management service 175, in turn causing devices in communication with document management service 175, e.g., wireless handheld device 160 and display device 162, to reflect their respective new pointer positions.

In another embodiment, audience support service 180 and presenter service 178 enable roaming among multiple simultaneous multimedia presentations. In a venue in which multiple multimedia presentations are being presented, an audience member may wish to sample more than one presentation, roaming among presentations as desired. Audience support service 180 receives location-related information from one or more wireless handheld devices, e.g., devices 110, 120, 130, 140, 150, and 160. Location-related information may be derived from, e.g., Wi-Fi or cellular triangulation, near-field communications, geo-fencing, global positioning services, and Bluetooth beacons. FIG. 1 depicts Bluetooth beacons 111, 112, and 113 near the perimeter of room 101 in FIG. 1 to detect movement of one or more wireless handheld devices.

Presenter service 178 maintains a real-time association between each multimedia presentation currently being presented and its location, e.g., first, second, and third presentations are respectively being presented in first, second, and third rooms. Presenter service 178 obtains location-related information for a multimedia presentation, e.g., the first presentation, from a wireless handheld device, e.g., presenter devices 150 and 160, moderator device 140 (including via, e.g., moderator service 183), display device 162, or any device associated with a presentation, and associates the location-related information to the multimedia presentation, e.g., the first presentation, in accordance with one embodiment. Document management service 175 receives location-related information corresponding to presenters and audience members from other services, e.g., services 178, 180, and 183 in accordance with one embodiment, and maintains and associates the location-related information with presentations and audience members. Audience support service 180 receives location-related information from a first wireless handheld device situated in the first room and communicates the location-related information to presenter service 178. Audience support service 180 communicates the location-related information to document service 175 in accordance with one embodiment. Moderator support service 183 receives location-related information from a first wireless moderator device, e.g., device 140, and communicates the location-related information to document service 175 in accordance with another embodiment. Service 178 identifies that the first wireless handheld device is in the first room, and requests, through an API to document management service 175, for it to retrieve the first multimedia presentation. Service 175 then communicates through an API to audience support service 180 which begins transmitting a portion of a first electronic presentation to the first wireless handheld device comprising a portion of the first multimedia presentation, including any portion already presented by the presenter to audience members and real-time portions of the presentation, to the first wireless handheld device. The first electronic presentation includes first visual and aural components corresponding to the first multimedia presentation. In general, an electronic presentation, e.g., the first electronic presentation, may comprise one or more aural components, one or more visual components, or one or more aural and visual components.

Presenter support service 178 performs functions as described below. Service 178 identifies the audience member corresponding to the first wireless handheld device in one embodiment, and alerts presenter 155. Presenter support service 178 communicates via an API with customer data service 194 in another embodiment, to e.g., a CRM system, to associate information relating to the audience member's consumption of the first multimedia presentation, including, e.g., portions viewed, and durations of viewing. As the audience member roams, e.g., from the first to the second multimedia presentation, audience support service 180 receives updated location-related information from the first wireless handheld device, and communicates the updated information to presenter support service 178, which alerts presenter 155 that the audience member corresponding to the first wireless handheld device has left the first multimedia presentation. In another embodiment, presenter support service 178 communicates with customer data service 194, e.g., to update CRM data relating to the audience member including information relating to the audience member's viewing of the first multimedia presentation.

Figure 9:
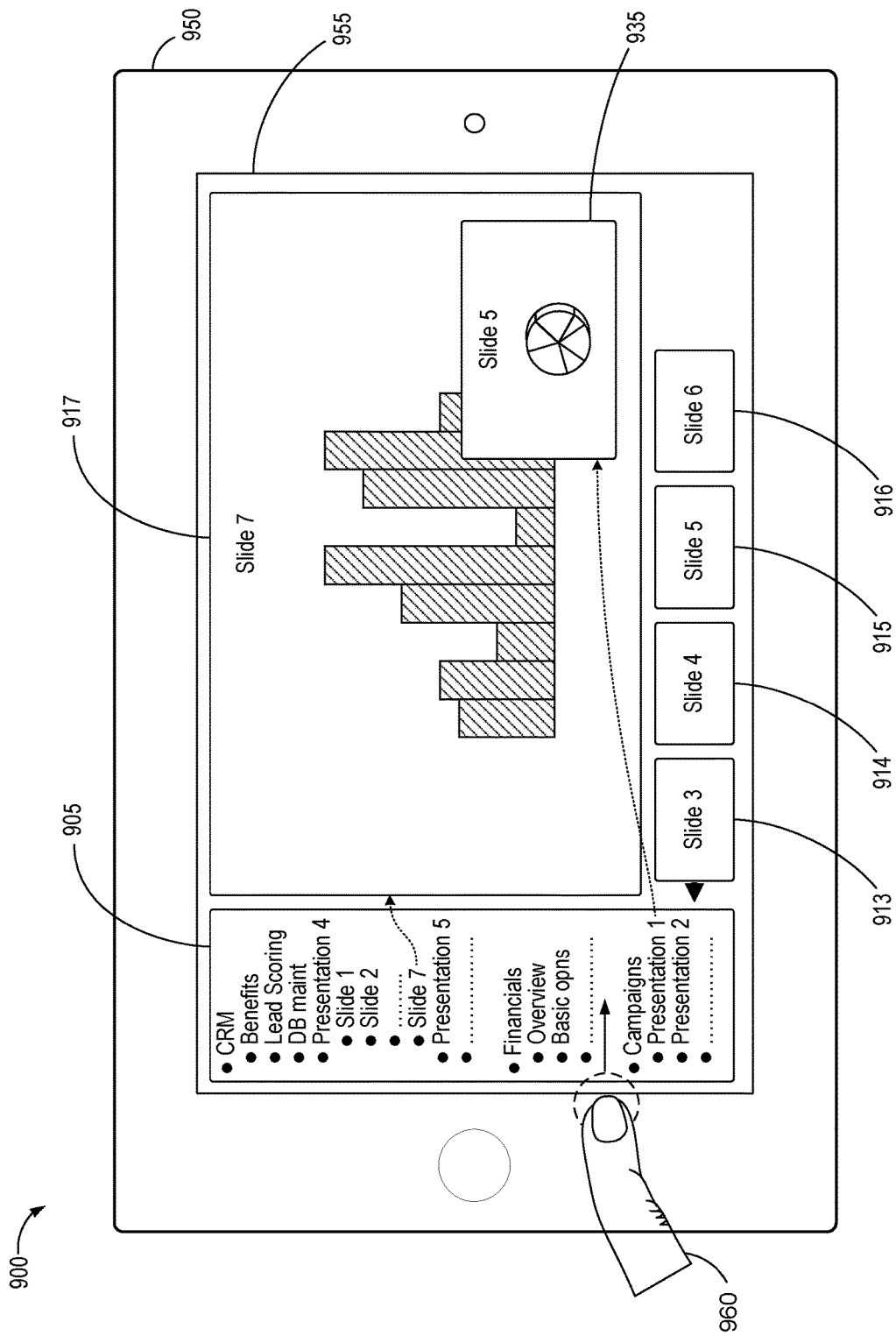
FIG. 9 depicts a view of a user interface on a client device in accordance with one embodiment.
Figure 10:
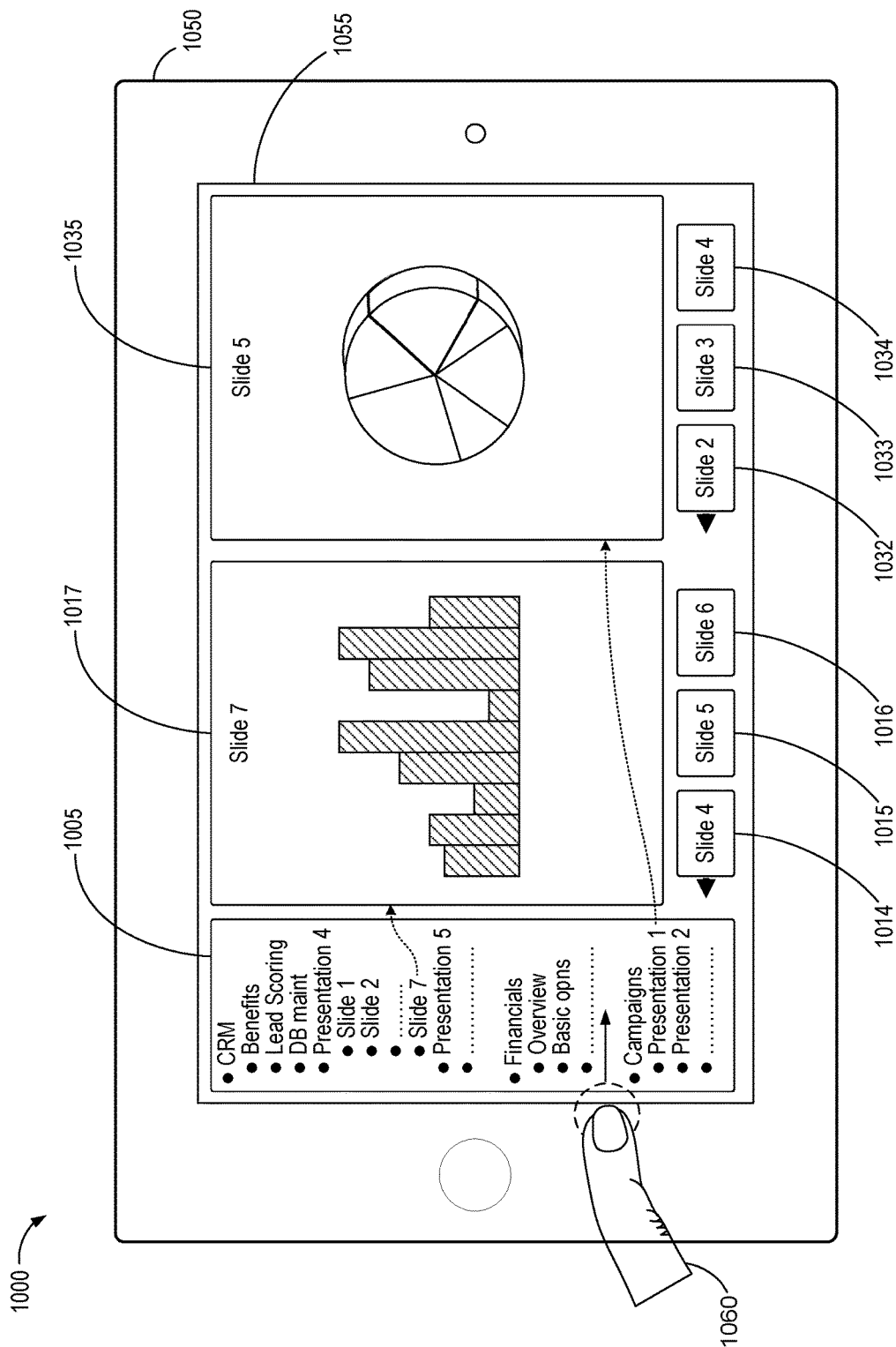
FIG. 10 depicts a view of a user interface on a client device in accordance with another embodiment.

Once the first wireless handheld device enters the second multimedia presentation, audience support service 180 transmits updated location-related data to presenter support service 178, which identifies that the first wireless handheld device is in the second room. As described with respect to the first multimedia presentation, presenter support service 178 alerts a second presenter that the audience member has arrived, audience support service 180 begins transmitting a portion of a second electronic presentation comprising a portion of the second multimedia presentation to the first wireless handheld device, and CRM data is updated. The second electronic presentation includes second visual and aural components corresponding to the second multimedia presentation. An audience member may therefore conveniently roam among presentations and automatically receive, on his or her wireless handheld device, the appropriate presentation. Moreover, audience member roaming data captured, e.g., in a CRM system, enables analysis, e.g., relating to the efficacy of a multimedia presentation and audience member preferences. Document support service 175 performs the functions described above with respect to presenter service 178 in accordance with another embodiment. Audience support service 180 routes the first visual component to, e.g., window 917 of wireless handheld audience device 950, as depicted in FIG. 9, and the second visual component to window 935, in a "picture-in-picture" ("PIP") viewing mode, in accordance with another embodiment. In this mode, the first and second visual components overlap one another. The first and second visual components are respectively displayed side by side in windows 1017 and 1035 on wireless handheld device 1050 as depicted in FIG. 10, in a "picture outside of picture" ("POP") viewing mode, in accordance with still another embodiment. As wireless handheld devices roam (see below), audience support service 180 receives location information from the devices and in response, may transpose (swap) the first and second visual components respectively between windows, e.g., between windows 917 and 935, and between windows 1017 and 1035. Audience service 180 receives an express preference from a wireless handheld audience device, e.g., devices 110, 120, or 130, in accordance with another embodiment, and in response, may transpose (swap) the first and second visual components respectively between windows, e.g., between windows 917 and 935, and between windows 1017 and 1035.

In another aspect, the first electronic presentation may include the first visual component corresponding to the first multimedia presentation and the second aural component corresponding to the second multimedia presentation. An audience member may therefore advantageously consume two multimedia presentations simultaneously, here, the first multimedia presentation visually and the second multimedia presentation aurally. Similarly, the second electronic presentation may include the second visual component corresponding to the second multimedia presentation and the first aural component corresponding to the first multimedia presentation. Audience support service 180 receives an express selection from a wireless handheld audience device, e.g., 110, 120, and 130, associating visual and aural components to an electronic presentation in accordance with one embodiment. Audience support service 180 maintains associations among an arbitrary number of electronic presentations, and an arbitrary number of visual and aural components corresponding to multimedia presentations. For example, when the first wireless handheld device roams, e.g., from the first room to the second room and audience support service 180 transmits the second electronic presentation to the first wireless handheld device, the second electronic presentation may include the second visual component and the first aural component. Audience service 180 selects an aural component to transmit to a wireless handheld audience device based on location-related information it receives from the device in one embodiment. In another embodiment, audience service 180 selects the aural component in response to an express selection it receives from the wireless handheld device, the selection asserted by an audience member.

Audience support service 180 supports communication with wireless handheld audience devices, e.g., devices 110, 120, and 130, including delivering the presentation to the wireless handheld audience devices, enabling viewing by audience members, e.g., 115, 125, and 135, of portions of a presentation, sending information to audience members, and receiving and responding to audience feedback. In one embodiment, audience support service 180 provides an audience interface for the multimedia presentation to a wireless handheld audience device, e.g., devices 110, 120, and 130, via the network. Information sent to an audience member includes, e.g., poll questions, and a profile of presenter 155. Audience feedback includes, e.g., "likes," questions, and comments, and may be formatted as text, audio, or video content. An interface, e.g., provided by audience support service 180, for use by audience members 115, 125, and 135, is provided by an application executing respectively on devices 110, 120, and 130 in one embodiment. A web browser-based interface, e.g., provided by audience support service 180, is provided in another embodiment. As described above, presenter support service 178 (and in accordance with another embodiment, document management service 175) provides electronic pointer synchronization across devices including wireless handheld audience devices. In one embodiment, an audience member, e.g., 115, 125, and 135, "logs in" respectively on wireless handheld audience device 110, 120, and 130, e.g., upon entering the building or room 101. In one embodiment, audience support service 180 identifies the member, and via, e.g., an API, communicates directly or via document management service 175, to customer data service 194 to associate the member with a customer data record, and further communicates with presenter support service 178 directly, or via document management service 175, to alert the presenter to the presence of the audience member. In another embodiment, presenter support service 178 records that the audience member is present, in preparation for a query from presenter 155.

Automated moderator service 183 supports presenter 155 by serving to moderate a flow of audience feedback to the presenter. In one embodiment, service 183 provides a moderator interface for the multimedia presentation to a wireless handheld moderator device, e.g., device 140, via the network. Service 183 filters and conditionally sends the feedback to the presenter in one embodiment. In another embodiment, presenter support service 178 receives audience feedback via, e.g., an API from audience support service 180, and displays the feedback on wireless handheld moderator device 140 for viewing by a moderator 145. The moderator then determines whether to forward the audience feedback to the presenter. In another embodiment, automated moderator service 183 operates automatically, in lieu of a human moderator. Factors that automated moderator service 183 "considers" include whether an audience member is a "hot" sales prospect, that is, one having a pending sales matter of significance, or whether a particular item of feedback, e.g., an insightful question or comment, relates to the subject matter of the presentation. By performing machine-based analysis, e.g., associating and cross-correlating inputs retrieved from other services, with one or more portions of the presentation and the audience feedback itself, automated moderator service 183 filters the feedback—dropping some altogether—while prioritizing the rest, and provides it to the presenter with the objective of enhancing e.g., a pending sales matter, or the presentation as a whole. In another embodiment, simple weighting and rules are applied to prioritize and present audience feedback to the presenter. In one embodiment, the audience feedback, e.g., after the associating and cross-correlating, or, e.g., at any time, is directed to customer data service 194 for storage, e.g., in an appropriate CRM category, e.g., customer data.

In one embodiment, automated moderator service 183 is configured to receive audience feedback via, e.g., an API from audience support service 180. Automated moderator service also communicates via, e.g., APIs, with document management service 175, presenter support service 178, audience support service 180, and customer data service 194. Automated moderator service 183 retrieves current and historical data, e.g., duration and related data for the presentation, customer data, and receives the identity of the portion of the presentation currently being displayed. Service 183 retrieves customer data, e.g., CRM data, linked to the presentation data, from customer data service 194. Automated moderator service 183 also retrieves customer data directly from customer data service 194 relating to audience members, e.g., members 115, 125, and 135, who were previously identified as present. From audience support service 180, automated moderator service 183 receives audience feedback.

Figure 2:
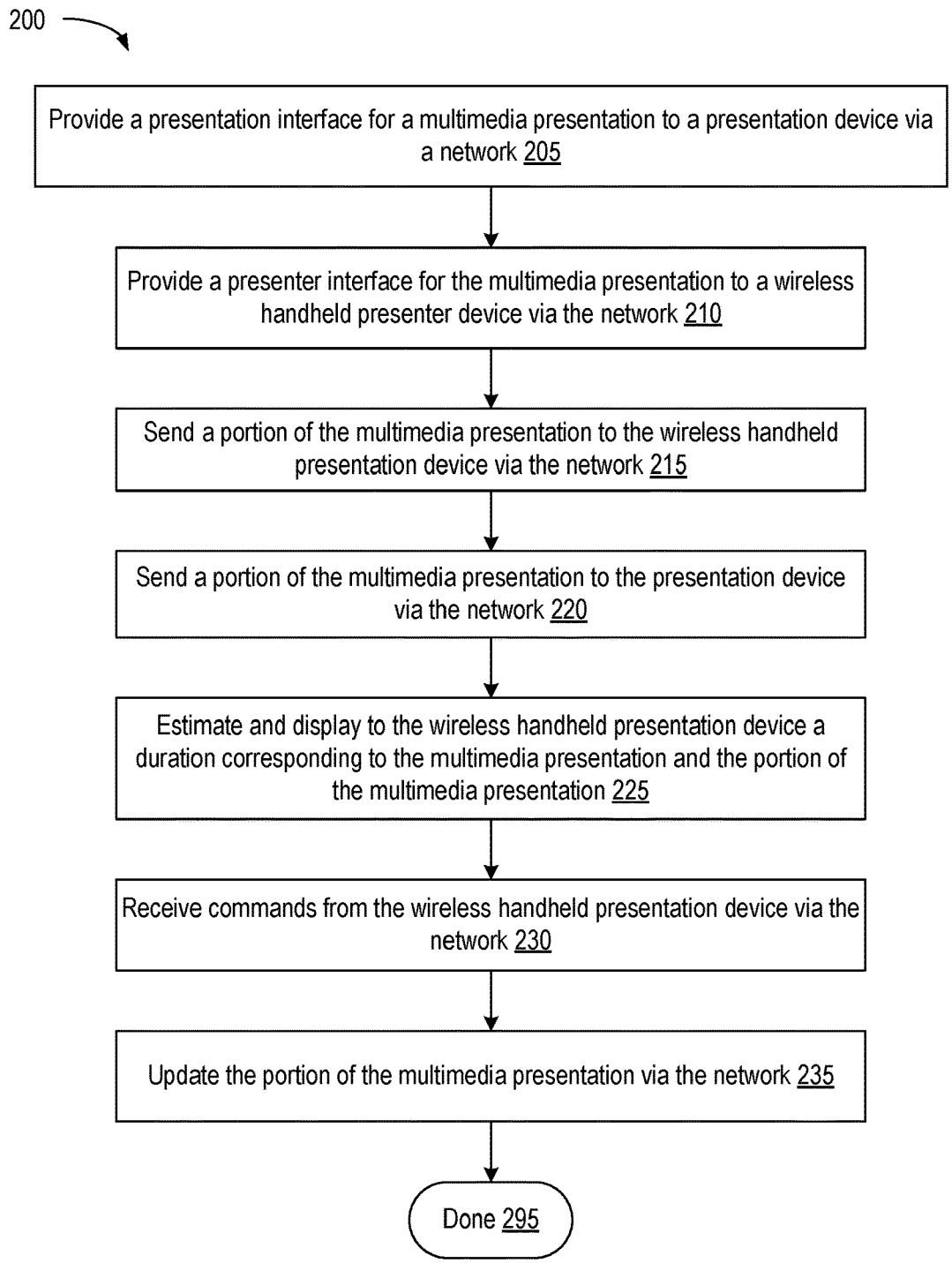
FIG. 2 is a flowchart depicting a method for presenting a multimedia presentation in accordance with one embodiment.

FIG. 2 is a flowchart 200 depicting a method for presenting a multimedia presentation in accordance with one embodiment. The method facilitates communication between a presenter of a multimedia presentation and audience members of the presentation co-located with the presenter in a room of a building. At step 205, the method provides a presentation interface for a multimedia presentation device, e.g., presentation device 162, via the network. In another embodiment, presentation device 162, e.g., a large flat screen display or a projection device, situated in room 101 of a building, communicates via a public network, e.g., public WAN 108, with a remote server, e.g., presentation server 165 and data server 185, for presenting the multimedia presentation to members of an audience. The remote server includes processors, memory, storage, e.g., hard disk and database storage, and services that receive commands, intercommunicate with one another, and deliver portions of the multimedia presentation and other data to various devices in room 101. The remote server stores one or more multimedia presentations, typically associated with one or more user accounts, data relating to the presentations, including historical data, e.g., metrics and analytics relating to, e.g., durations of portions of multimedia presentations, audience feedback, e.g., "likes" and comments, and presenter comments.

In step 210, a presenter interface for the multimedia presentation is provided to a wireless handheld presenter device, e.g., handheld 150 and laptop 160, via the network. The wireless handheld presenter device, e.g., handheld 150 and laptop 160, communicates in another embodiment with the remote server via the public network, e.g., public WAN 108. In step 215, the method sends a portion of the multimedia presentation to the wireless handheld presenter device, e.g., device 150, via the network. In another embodiment, a presenter 155 operates the handheld presenter device in another embodiment, which issues commands to the remote server. In response to the commands, the remote server sends, in step 215, a portion of the multimedia presentation to the presenter, who may view it on wireless handheld presenter device 150. In step 220, the method sends a portion of the multimedia presentation to the presentation device, e.g., presentation display 162, via the network. The portion of the multimedia presentation is also sent to wireless handheld audience devices, e.g., 110, 120, and 130 in another embodiment, via the network. In still another embodiment, the remote server sends the portion of the multimedia presentation to the presentation device 162, and to wireless handheld audience devices, e.g., devices 110, 120, and 130. The remote server may send different portions to presentation device 162, and to each handheld presenter device, and may render the portion appropriately for the respective display device. For example rendering a portion to a handheld device may require fewer elements, arranged and scaled differently than the same portion rendered to presentation device 162. A portion may include one or more audio and video elements, e.g., live streams or files, links to streams or files, and text. A presentation may be created in presentation software, e.g., Zoho Presentation provided by Zoho Corporation Private Limited, and Microsoft PowerPoint. In another embodiment (not depicted in FIG. 2), display device 162, and handheld devices 110, 120, and 130, project the portion of the multimedia presentation to audience members within the room.

In step 225, the method estimates and displays to the wireless handheld presenter device, e.g., device 150, a duration corresponding to the multimedia presentation and the portion of the multimedia presentation. In another embodiment, presenter support service 178 estimates a duration for the portion of the multimedia presentation being displayed, and displays it to presenter 155 on the wireless handheld presenter device 150. Support service 178 also estimates a duration corresponding to the multimedia presentation as a whole, and also displays it to the presenter. The estimates may also be displayed on wireless handheld moderator device 140 for viewing by moderator 145. In step 230, the method receives commands from the wireless handheld presenter device, e.g., device 150, via the network. In another embodiment, wireless handheld presenter device 150 next sends commands to the remote server via public WAN 108, and in response, the remote server updates the portion of the multimedia presentation projected on display device 162, and displayed on handheld devices, e.g., 110, 120, and 130, within room 101. In step 235, the method updates the portion of the multimedia presentation via the network. The method finishes at step 295.

Wireless handheld audience devices 110, 120, and 130, e.g., an iPhone or iPad provided by Apple, Inc. of Cupertino, Calif., include, in one embodiment, an application enabling the devices to communicate with the remote server and receive commands from it to, e.g., appropriately scale, arrange, and display a portion of the multimedia presentation. Accordingly, updating the multimedia presentation to these devices, e.g., presentation hardware, comprises the remote server sending second commands to the presentation device. Display device 162 may similarly include application software capable of receiving commands from the remote server. In addition to the remote server updating the portion of the multimedia display in response to commands from device 150, the remote server also sends a second portion to the audience devices, e.g., 110, 120, and 130, after sending the portion first-mentioned. Alternatively, the remote server may arrange the portions such that the second portion precedes the first-mentioned portion in the presentation.

FIG. 3 is a flowchart 300 depicting a method for presenting a multimedia presentation in accordance with another embodiment. FIGS. 2 and 3 share similar elements. For brevity, elements of FIG. 3 corresponding to elements of FIG. 2 that have been described above, are omitted from the description that follows. At step 340, the method provides an audience interface for the multimedia presentation to a wireless handheld audience device, e.g., devices 110, 120, and 130, via the network, and in step 345, identifies the audience member, e.g., 115, 125, and 135, corresponding to the wireless handheld audience device. In step 350, the method retrieves, via the network, customer data corresponding to the audience member. Customer data may be retrieved from any number of resources, e.g., a CRM system, a contacts database, or an address book, any of which may be "in the cloud" resources, hosted in-house, outsourced. Presenter service 178 directly performs the retrieval in accordance with one embodiment. In another embodiment, presenter service 178 makes its request via customer data service 194. In another embodiment, after communicating between a wireless handheld device and the remote server via a public network, e.g., public WAN 108, the method identifies the audience member, e.g., 115, 125, and 135, corresponding to the wireless handheld audience device, respectively 110, 120, and 130. "Connecting" includes establishing communication between or among one or more network nodes, e.g., a remote server, including any service 175, 178, 180, 183, or 194, which may receive communication from a device, e.g., display device 162, and wireless handheld presenter devices 150 and 160, and thereafter establish a connection via, e.g., TCP/IP. In another embodiment, communication between a device and a remote server is established via, e.g., a manual or automatic logon process. A remote server may similarly initiate and establish communication with a device. Audience support service 180 communicates with an application running on the handheld device (110, 120, and 130) to retrieve an identification handle corresponding to the audience member, then, via, e.g., an API, it communicates in step 350 to customer data service 194 to retrieve customer data corresponding to the customer. Customer data includes the name of each audience member identified, and may also include information relating to, e.g., pending sales matters. Audience support service 180 next communicates via API to presenter service 178, which in turn communicates to an application running on wireless handheld presenter device 150 to display to presenter 155 the customer information relating to audience members 115, 125, and 135, identifying them as, e.g., current or prospective customers. The method finishes at step 395.

FIG. 4 depicts portions of a presentation and a data structure 400 relating to a multimedia presentation in accordance with one embodiment. For a multimedia presentation to be successful, a presenter needs to guide an audience through the presentation, keep their interest, and attract their attention. One aspect of keeping interest is managing duration—the time spent on any portion and the presentation as a whole. For example, if audience feedback includes an insightful question or comment, the audience may welcome an extended colloquy. Or, if a "hot" sales prospect joins an audience, the presenter may wish to modify the presentation responsive to the feedback, and spend more time on a topic of relevance to that prospect. In response, the presenter may modify the duration, order, or flow of a presentation. Modifying the presentation may also comprise increasing the audio volume of the presentation. In turn, however, the duration of portions remaining in the presentation, and a multimedia presentation duration, e.g., a duration of the presentation as a whole, should be determined to avoid running too long, or "losing" the audience.

During and after creation, a presentation is typically rehearsed, and its portions are ordered, reordered, and modified appropriately. A presenter may wish to time her talk, view a slide with notes, perform on-the-spot edits, and "shuffle the deck" to sharpen memory and recall of the presentation. Rehearsal may be accomplished in a presentation environment, e.g., including display device 162, wireless handheld audience devices, e.g., 110-130, and wireless handheld presenter device 150. Rehearsal may be undertaken in any location, e.g., remotely, "on-the-go," via a mobile application, also referred to as a Trainer application, in accordance with another embodiment. Durations relating to each portion are saved in a data structure 400 depicted in FIG. 4. A presentation metadata service 490 manages aspects of metadata relating to multimedia presentations. Here, a presentation comprising portions 401-410 is depicted in FIG. 4. Tables 420-450 comprise metadata relating to the presentation. For convenience, FIG. 4 depicts four tables (420-450), however, fewer or more may be used within the scope of the invention. As depicted, each row of tables 420-450 corresponds to a portion of the presentation, e.g., row 1 to portion 401, row 2 to portion 402, and so forth. Tables 440 and above, and corresponding table 480 and above, include historical data from prior runs-through of a presentation. Table 430 and corresponding table 470 include data collected during a current run-through of a presentation. At the conclusion of a rehearsal, or a presentation to an audience, presentation metadata service 490, communicating via, e.g., an API with presenter support service 178, receives from service 178, a duration corresponding to each portion of the presentation determined during rehearsal, and records it in the "Dur" (duration) column respectively in rows of table 430. In one embodiment, customer data are also stored to, e.g., a CRM database, and one or more links to one or more customer data records relating to, e.g., one or more audience members, are stored in the "CD" column of table 430. At the conclusion of a rehearsal or audience presentation, table 430 and related table 470 are renumbered and respectively grouped with historical tables 440, 450, and 480. Metadata relating to any presentation therefore become available as historical data for future presentations, thereby enabling process improvements to be made. At the beginning of a new rehearsal or audience presentation, "new" tables 430 and 470 are created for capturing new presentation metadata.

In one embodiment, presentation metadata service 490 may be incorporated in, or distributed among, any of document management service 175, presenter support service 178, and audience support service 180. A weighting factor corresponding to each portion is recorded in a column labeled "Wt," depicted adjacent to the "Dur" column in table 430. Weight ("Wt") is one of many factors used to estimate the duration of a portion during a presentation. Here, the weight defaults to unity (1), however, it may be adjusted to signal that a portion is of higher (or lower) significance than other portions. A third column relating to customer data, "CD," typically contains one or more pointers to customer data stored in the data server 185, e.g., a CRM (customer relationship management) system. In another embodiment, it may directly contain customer data. Such information, combined in real time with audience feedback, is used to update duration determinations during a presentation. Tables 470 and 480 depict exemplary customer data records stored in data server 185 in one embodiment. The first row of tables 470 and 480 identify a customer by name, the second row identifies whether or not the customer is engaged in an active sales matter, e.g., a "hot" prospect, the third row identifies one or more products the customer may purchase, and the forth row includes customer relationship notes. Other customer relationship information may be included in tables 470 and 480 in other embodiments.

Another aspect of a successful presentation relates to creating or enhancing sales leads that may arise in relation to the presentation, e.g., as consequence of subject matter relevance to a sales prospect, while presenting to an audience, or during rehearsal. Audience reaction or interaction data, e.g., data relating to audience members such as questions, comments, "likes" relating to one or more presentation portions, and time spent on one or more presentation portions, are received by audience support service 180 and transmitted to metadata service 490 in accordance with one embodiment. Metadata tables 470 and 480 include one or more tags ("@tag") in one embodiment, for identifying, e.g., one or more CRM users responsible for sales or marketing a product. Customer data service 194 automatically correlates portions of the presentation with data from the customer data resource, e.g., CRM, to determine appropriate tags. Audience reaction data may be parsed for, e.g., product and sales-relevant information and tagged by service 194. For example, service 194 may determine the subject matter of portion 401 of the presentation includes subject matter relevant to customers and sales leads serviced by individuals identified by @tag1 and @tag2. It then communicates the tags to metadata service 490, which inserts them into table 470 at row 4. During a presentation or rehearsal, a presenter may also "tag" a portion's metadata, for example, with @tag3. Presenter support service 178 communicates @tag3 to metadata service 490, which adds it table 470 at row 4. A date stamp may also be included with each tag. Tags are advantageously available to a lead scoring algorithm.

Lead scoring is an algorithm that scores and ranks sales leads according to prospects most likely to buy, thereby enabling salespeople to effectively focus their efforts. Information relating to sales leads, typically stored in a customer data resource, e.g., CRM, are correlated and weighed to determine lead scores. This information typically includes company size, market size, potential spend amounts, dates of contact with sales prospects, other time-relevant events, and behavioral aspects, e.g., whether a sales prospect has responded to on-line surveys, and so forth. Tags, by virtue of their close association to relevant subject matter included in multimedia presentations, may serve as a powerful input to a lead scoring algorithm.

Present and historical metadata, included in data structure 400, including information pertaining to attendees registered for a particular presentation to be given, are provided as inputs via metadata service 490 to the lead scoring algorithm. For example, metadata 490 parses portions 401 and 402 of FIG. 4 and transmits parsed data to the lead scoring algorithm, which ranks the portions based relevance of their respective content, e.g., as indicated by the parsed data, to the audience, e.g., as indicated by customer resource data, including subject matter interest, likely spend, region, date and time of most recent contact. The lead scoring algorithm returns its scores to metadata service 490, which inserts them respectively in the fifth row of tables 470 and 480. Thus, in preparing a multimedia presentation, a lead score is used to rank a portion, e.g., a slide, to determine a duration for each portion of the overall presentation. In another embodiment, the method just described is applied in real-time as attendees come and go, and lead scores are communicated to metadata service 490 by audience support service 180, to dynamically adjust, or tune, the duration of each presentation portion. Document management service 175 communicates the lead score for each portion to presenter support service 178 for use by the presenter, and to automated moderator service 183.

In another aspect, a trailer, also referred to as a preview, is a multimedia presentation that provides a summary or introduction, e.g., highlights, of a pre-existing multimedia presentation, thereby introducing and enhancing its appeal to a prospective audience, and serving to, e.g., generate interest in an upcoming event such as a conference. One or more trailers relating to a pre-existing multimedia presentation, each tailored to one or more prospective audience members, are automatically created in accordance with one embodiment, thereby advantageously enabling precise targeting on a large scale. In one embodiment, the tailoring is performed in relation to customer resource data. As customer resource data change over time, e.g., CRM data are updated as a sales cycle progresses, the one or more trailers, whether initially created automatically or manually, are automatically updated in accordance with another embodiment, thereby further enhancing targeting.

In one embodiment, metadata service 490 includes an automated trailer creation service. Metadata service 490 receives a request from document management service 175 to create a first trailer in accordance with one embodiment. The request identifies a first pre-existing multimedia presentation, e.g., corresponding to portions 401-410 depicted in FIG. 4, and may include optional selection criteria, for example, a slide count, and a region, e.g., a location corresponding to an upcoming event or conference. A second, and optionally additional pre-existing multimedia presentations, are specified in another embodiment. Metadata service 490 reads metadata table 415 corresponding to the first multimedia presentation and at row 5, references a pointer to trailer spec table 417. Illustratively and without limitation, trailer spec table 417 specifies a maximum number of slides to include in the first trailer ("Slide count"), and a region corresponding to a locale in which an upcoming event is to take place. More or fewer specifications, e.g., "Other," may be included as desired in trailer spec table 417 within the scope of the invention. Metadata service 490 parses portions of the first pre-existing multimedia presentation, e.g., as depicted in FIG. 4, and together with criteria specified in table 417, transmits one or more requests to customer data service 194 to make one or more queries to customer and other data resources, e.g., CRM, SalesIQ, Campaigns, and Contacts. Metadata 490 receives results of the one or more queries from customer data service 194, which include contact information for potential attendees cross-referenced to subject matter pertaining to the first pre-existing multimedia presentation. For a first contact, metadata service 490 next ranks the relevance of subject matter of each slide from the first pre-existing multimedia presentation, and creates a first trailer including relevant subject matter, up to the slide count specified in table 417, enters a title for the first trailer in row 1, column 1 of table 419, and enters first contact information in row 1, column 2. The process repeats for each contact until a trailer has been created for each contact. Notably, one or more contacts may be selected to receive the same trailer in accordance with one embodiment, and multiple contacts are entered as a contact list in column 2 corresponding to the trailer. Each trailer is transmitted to its associated contact(s) via email, e.g., including a URL to the trailer, a direct push to an audience support interface, e.g., via audience support service 180, or via, e.g., a mobile application. Audience support service 180 receives feedback from audience members, e.g., comments and "likes" via e.g., the mobile application, and transmits the feedback to presenter support service 178 for presentation on a wireless handheld presenter device, e.g., device 150.

In another embodiment, a portion duration is determined for each portion of a trailer as described above with respect to a multimedia presentation. A presenter, e.g., presenter 155, may desire to manually specify portions for manually creating a trailer from a multimedia presentation, e.g., as depicted in FIG. 4, to run, e.g., in a loop immediately before a live presentation. In that embodiment, Metadata service 490 receives a list of slides from presenter interface 178, enters them in row 4 of table 415, and selects slides from the multimedia presentation to create a second trailer. As in the case of an automatically created trailer, metadata service 490 parses the multi-media presentation to determine a portion duration for each portion of the trailer, advantageously timing portions, e.g., longer durations for subject matter of greater relevance to an audience.

Figure 5:
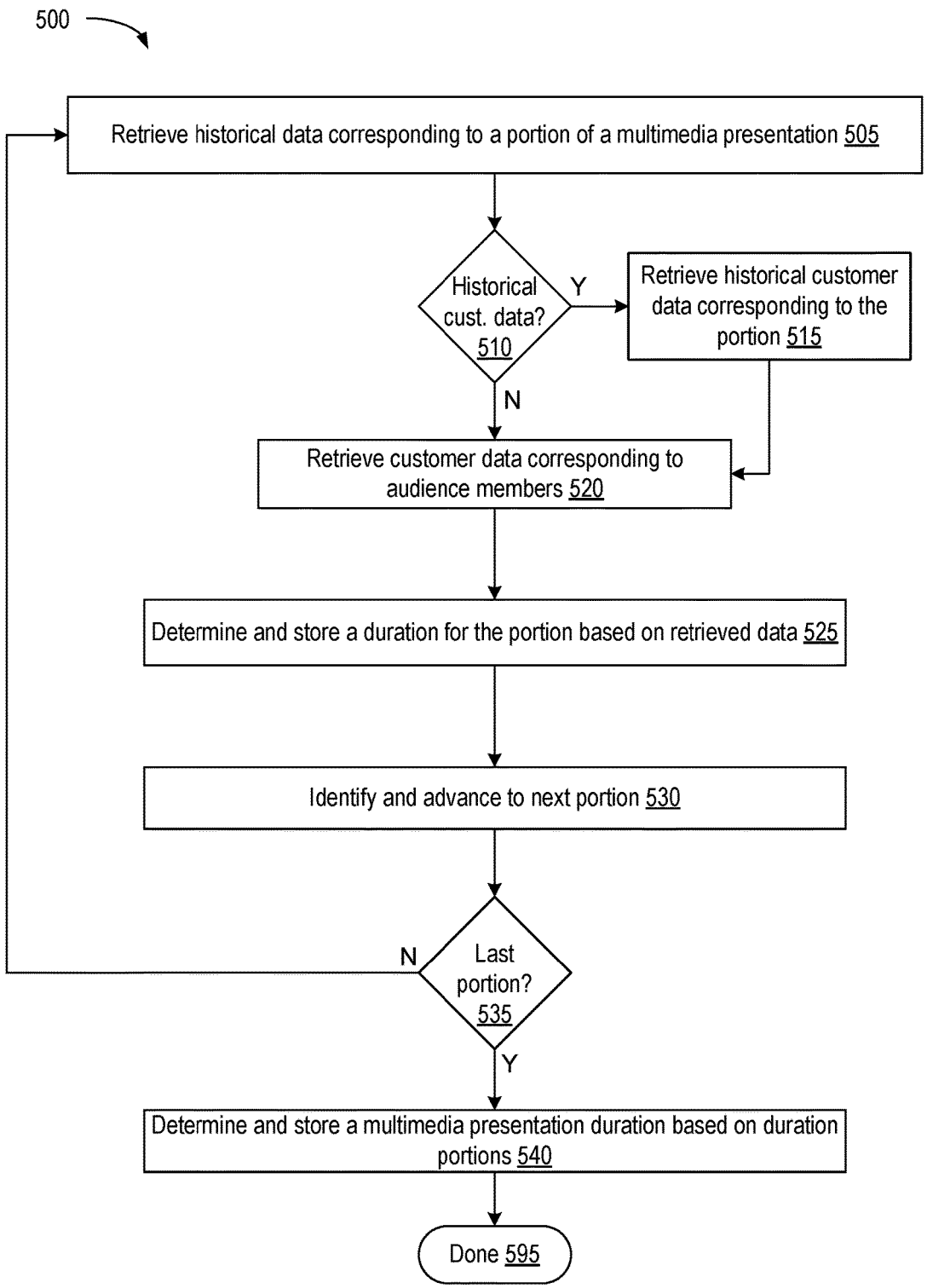
FIG. 5 is a flowchart depicting a method for estimating a duration of a portion of a multimedia presentation in accordance with one embodiment.

FIG. 5 is a flowchart 500 depicting a method for estimating a duration of a portion of a multimedia presentation, and a multimedia presentation duration, in accordance with one embodiment. In step 505, the method retrieves historical data corresponding to a portion of the presentation, e.g., duration ("Dur"), weight ("Wt"), and customer data ("CD") from tables 440 and 450 depicted in FIG. 4. The method next determines in step 510 whether the data just retrieved includes or refers to, e.g., by pointer or link, historical customer data. If so, the method branches to step 515 and retrieves the historical customer data. For example, if the method identifies that the "CD" column corresponding to row 10 of table 440 includes pointer "B" to table 480, it retrieves historical customer data from table 480, which in one embodiment, is located in data server 185, e.g., storage 195. In step 520, the method retrieves customer data corresponding to audience members. In one embodiment, described above with reference to FIGS. 1-3, audience identities have been retrieved from wireless handheld audience devices, e.g., 110, 120, 130 and are available to the method. Next, the method, in step 525, determines a duration for the current portion by, e.g., combining durations, weights, and customer data (historical and current), and storing the resultant duration in table 420. In step 530, the method advances to the next portion and determines at step 535 whether the last portion has been reached. If not, the method repeats the previous steps. If so, the method combines individual portion durations to determine a multimedia presentation duration, and stores it in table 420. The method finishes at step 595.

In one embodiment, the method operates continuously. For example, as a presentation (rehearsal or to an audience) progresses, the method determines a presentation duration corresponding to a current and remaining portions to be presented. The duration is scaled, e.g., ratably, based on a ratio of an actual time remaining for a presentation as a whole, e.g., 30 minutes (it is now 2:30 P.M. and the presentation must end by 3:00 P.M.), to the sum of durations for the current and remaining portions. For example, if the presentation must end in 30 minutes, the estimated duration for the current portion is 5 minutes, and the sum of durations of the current and remaining portions is 35 minutes, then the method scales the current portion to 5×30/35=4.3 minutes, and presents this figure to the presenter. The method in turn computes a new estimate for the portion as it is being presented. In another embodiment, the method operates ("triggers") in response to a change in customer data, e.g., from a third party data service, e.g., outsourced CRM, and in a further embodiment, receives the changed data itself, e.g., via a webhook, wherein the webhook provides updated or changed data upon the occurrence of any updated or changed data.

Figure 6:
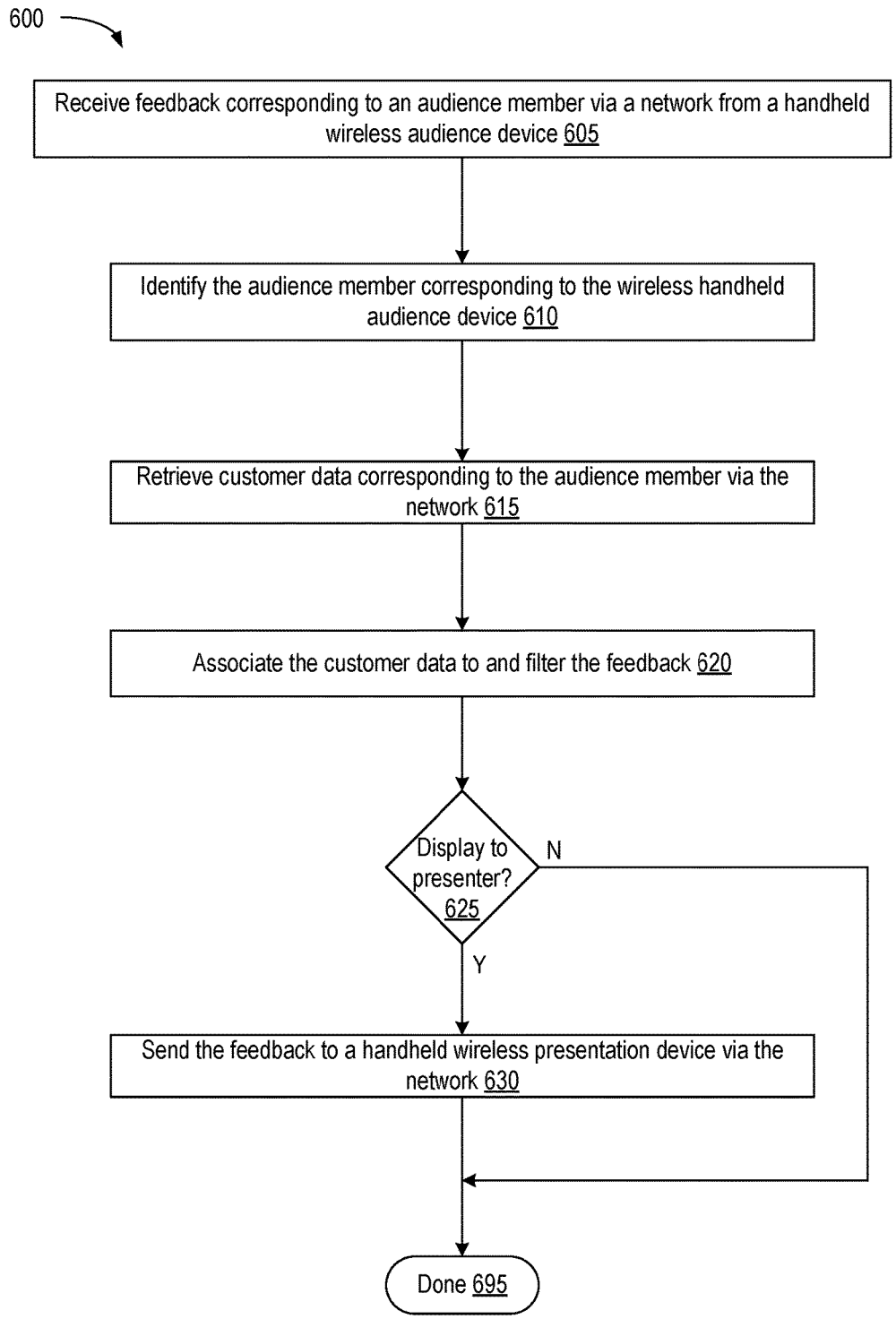
FIG. 6 is a flowchart depicting a method for automating feedback moderation relating to a multimedia presentation in accordance with one embodiment.

FIG. 6 is a flowchart 600 depicting a method for automating feedback moderation to a presenter of a multimedia presentation in accordance with one embodiment. During a multimedia presentation, it is advantageous for the presenter to automatically receive appropriately prioritized feedback from audience members. In one embodiment, prioritization, including blocking feedback, is based on the feedback, historical customer data stored in a customer relationship ("CRM") system, e.g., data server 185, and historical data relating to the presentation itself, e.g., as depicted in FIG. 4. In step 605, the method receives feedback corresponding to an audience member via a network from a handheld wireless audience device, e.g., devices 110, 120, and 130, identifies the audience member corresponding to the wireless handheld audience device in step 610, and in step 615, retrieves customer data corresponding to the audience member via the network. In another embodiment, the method receives feedback corresponding to an audience member, e.g., member 115, to a remote server (e.g., presentation server 165 and data server 185 depicted in FIG. 1 in one embodiment), from a wireless handheld audience device, e.g., device 110. In a next step, the method identifies the audience member corresponding to the wireless handheld device as described above with respect to, e.g., FIGS. 1-3, and retrieves from, e.g., data server 185, data corresponding to the audience member. In another embodiment, historical data relating to a portion of a presentation may include data retrieved via the data structure 400 depicted in FIG. 4. The method, at step 620, associates and cross-correlates the customer feedback with the retrieved data to provide an automated moderator result. In one embodiment, the associating and correlating feedback includes filtering and prioritizing based on various criteria. In one embodiment, the criteria include customer data corresponding to one or more audience members, and may be defined, and selected, by the presenter or moderator. Based on the associating and cross-correlating, the method determines at step 625 whether to display the feedback to the presenter. If so, the method at step 630 sends the feedback to the presenter via the network. The process finishes at step 695. In one embodiment, the method operates continuously.

Figure 7A:
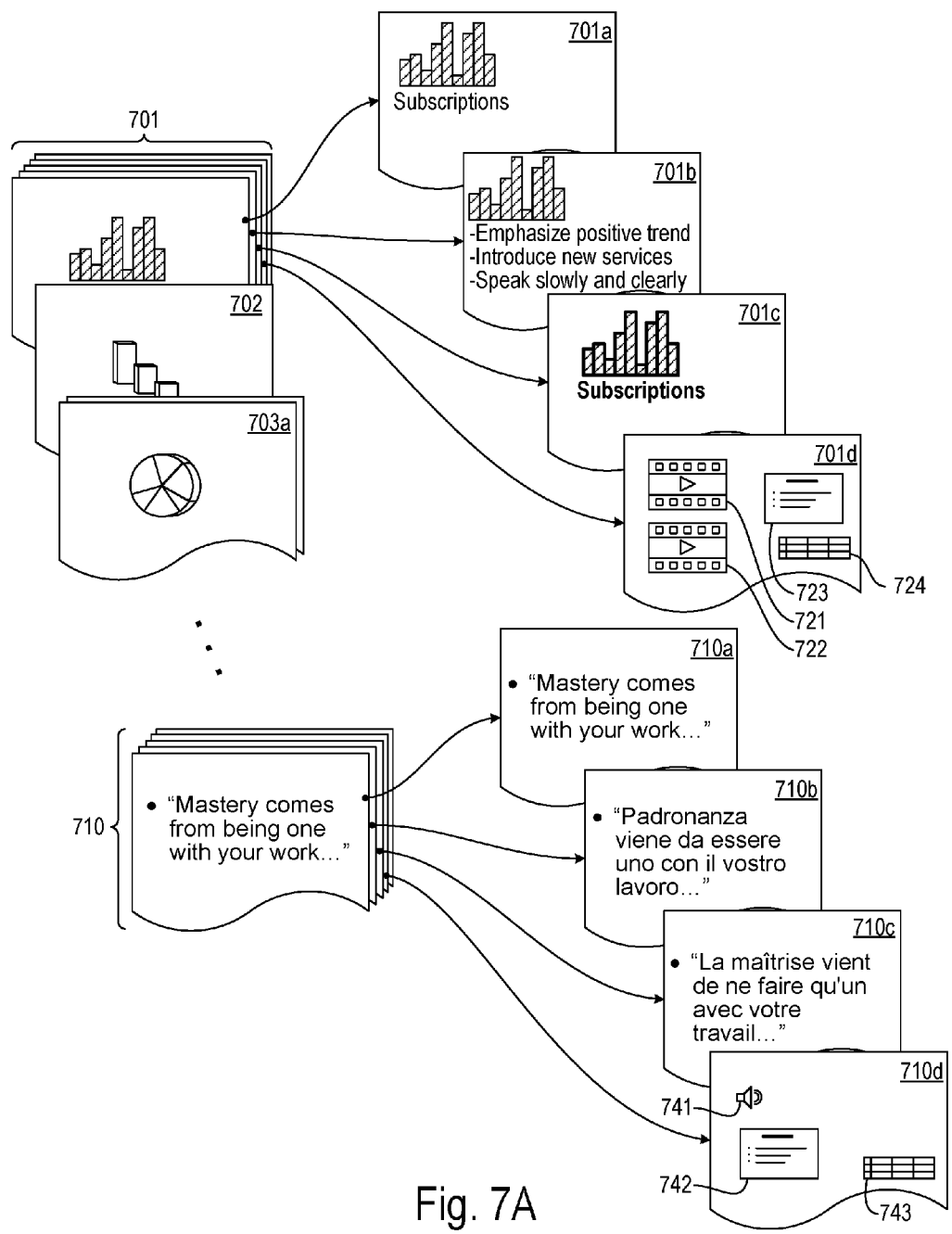
FIG. 7A depicts multi-layered slides relating to a multimedia presentation in accordance with one embodiment.

FIG. 7A depicts multi-layered slides 701-710, also referred to as multidimensional slides, relating to a multimedia presentation in accordance with one embodiment. A multimedia presentation contains one or more portions including audio, video, and slides. In one embodiment, a presentation includes slides, e.g., Zoho Presentation, Microsoft PowerPoint, one slide per portion. In another embodiment, a portion may contain a group of one or more slides. In one embodiment, the one or more slides may be related or associated. A relation or association of one slide to another may be referred to as a layer, or a dimension. A group is useful to, e.g., provide the presenter with "detailed" and "succinct" versions of a slide. In one embodiment, slide 701 includes "succinct" slide 701a (bar chart quantifying "subscriptions"), and "detailed" slide 701b for the presenter's eyes only, e.g., displaying only on wireless handheld presenter devices 150, or 160, which includes the information of slide 701a along with the presenter's notes, e.g., "speak slowly and clearly." In another embodiment, all slides in a group are intended for an audience. For example, slide 710 depicts a group of slides 710a-c, each reciting the same phrase in three languages: English, Italian, and French. Presentation service 178 automatically selects one of slides 710a-c based on a prior setting (stored, e.g., in data structure 400, or responsive in real-time to customer data received from customer data service 194 corresponding to attendees, e.g., audience composition by country, indicative of language and cultural tastes), thus relieving the presenter of real-time selection while communicating the presentation to the audience. In another embodiment, presenter support service 178 receives real-time audio of the presentation, e.g., via microphone in wireless handheld presenter device 150, performs language recognition and identifies that, e.g., French is being spoken, and selects French slide 710c. In one embodiment, presentation service 178 prompts the presenter to select a slide from a group during a presentation. In another embodiment, presentation service 178 identifies "for presenter's eyes only" slides, designated, e.g., in data structure 400, and presents them only to the presenter and not to the audience. In yet another embodiment, presentation service 178 receives voice input via, e.g., a microphone in wireless handheld presenter device 150, performs voice recognition and determines a phrase, e.g., a keyword or command. In response to the phrase, service 178 selects a resource, e.g., a slide, audio or video segment, and transmits the resource or a preview of it to the screen of device 150. Presenter 155 may then review the transmission from service 178 and determine whether to present it to the audience. Metadata, e.g., time and date stamps, and location-related information, are stored in a dimension in accordance with one embodiment.

In another embodiment, dimensions provide variations of the presentation relating to a presentation environment. For example, slide (dimension) 701c, depicted in FIG. 7A, is a high contrast version of slide (dimension) 701a, suitable for presentation in a brightly lit environment. Similarly, a small-format slide (dimension) may be provided for wireless handheld mobile devices, e.g., devices 110, 120, 130, 140, 150, and 160, and display device 162. Different aspect ratios, resolutions, color schemes, color saturation, brightness, contrast and gamma variations, and font types including anti-aliasing font variations, are also provided for various environments and devices. As explained above, audience support service 180 is location-aware, detecting whether a wireless handheld audience device is, e.g., in an area in which a multimedia presentation is taking place. Service 180 may therefore communicate with one or more sensors in one or more wireless handheld audience devices in the area of the presentation, e.g., room 101, perform a global or localized lighting analysis based on data obtained from the one or more sensors, determine lighting conditions, and report that information to document management service 175. Document service 175 communicates with sensors in one or more devices, e.g., a wired or wireless device, in accordance with another embodiment. Service 175 in turn selects one or more dimensions, appropriately formatted for the environment and the devices, and delivers the one or more dimensions respectively to the devices, e.g., display device 162, and via audience support service 180, to relevant wireless handheld audience devices, e.g., those within room 101.

In another embodiment, a dimension serves as a repository for annotations to the multimedia presentation, such as those described with respect to FIG. 8 below. For example, presenter service 178 includes annotation commands in the presenter interface, and a first annotation is made to the multimedia presentation with wireless handheld presenter device 150. Presenter service 178 receives the annotation from device 150. Document management service 175 receives the first annotation from presenter service 178, and stores and associates it in a first dimension of the multimedia presentation. One or more multidimensional slide templates are created and maintained by document management service 175 in one embodiment. A template may specify, e.g., formatting and attributes such as language, font size, color scheme on a dimension-by-dimension basis, thereby aiding in the creation of new multimedia presentations.

A program source, including video, audio, one or more document pages, and a multimedia presentation including one or more dimensions, is annotated with one or more annotation sources in any combination, in accordance with one embodiment. Like a program source, an annotation source may be any arbitrary source, including video, audio, document pages, and portions of other multimedia presentations. Annotations are associated with a multimedia presentation in a variety of ways. In one embodiment, the annotations are stored directly in a multimedia presentation dimension along with parameters for applying the annotations to the multimedia presentation. In another aspect, a multimedia dimension stores parameters for applying the annotations to the multimedia presentation, and stores references to the annotations rather than storing the annotations themselves. In that case, the annotations are stored outside the presentation, e.g., as computer disk files or in "cloud" storage. In yet another aspect, e.g., annotation table 724 depicted in FIG. 7B, a multimedia dimension stores one or more references to data tables that in turn refer to annotation sources. The dimension also includes parameters and specifications for applying the annotations to the multimedia presentation. Document management service 175 manages the annotations and tables on behalf of a presenter and moderator in cooperation with presenter support service 178, and on behalf of an audience member in cooperation with audience support service 180. A presenter, moderator, and with appropriate permissions enforced by audience support service 180, an audience member, may individually store and annotate a multimedia presentation, and create a platform-independent movie based on the annotated multimedia presentation. A link to the presentation movie is made available for further editing and sharing.

Figure 7B:
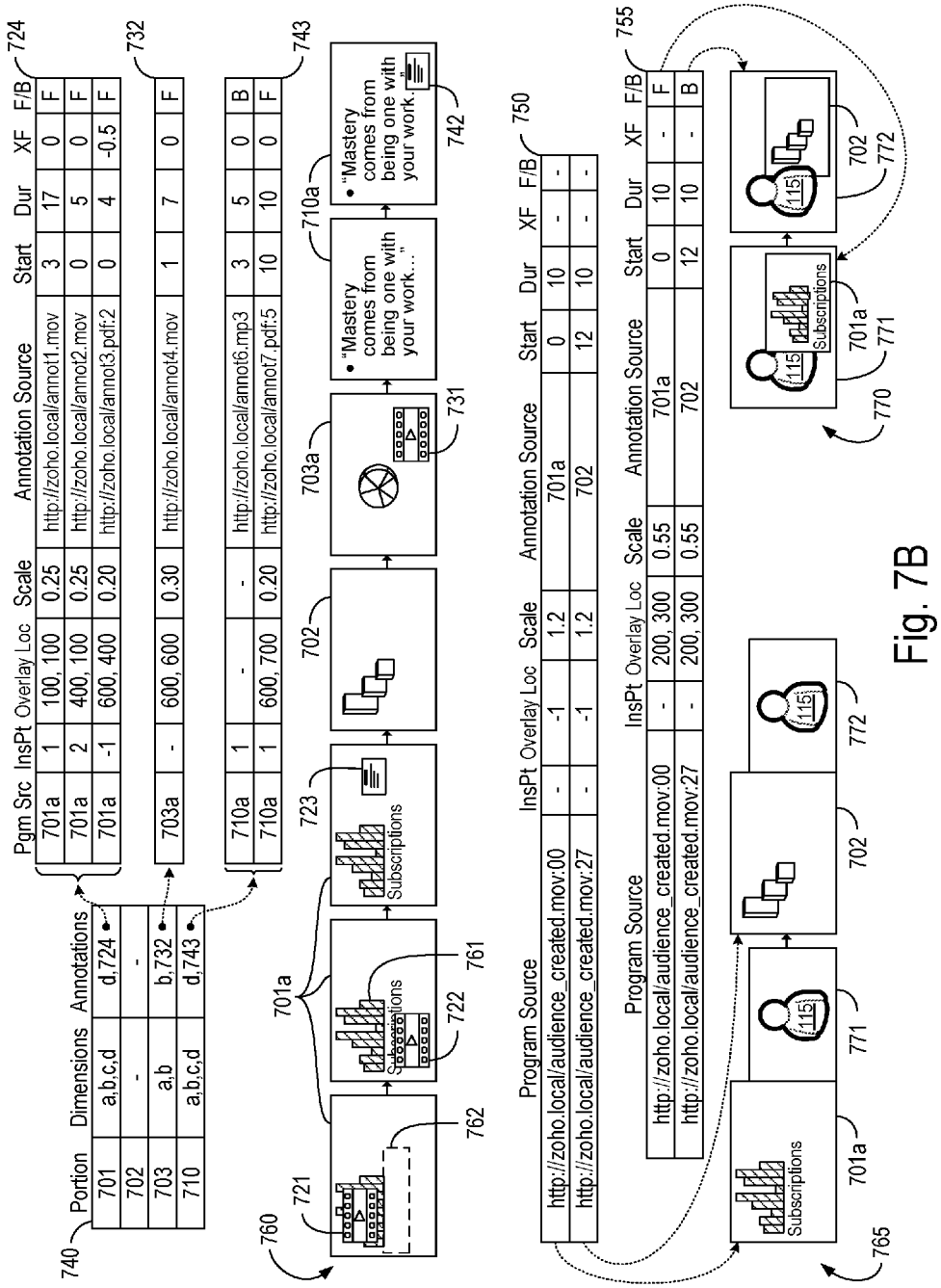
FIG. 7B depicts portions of a presentation and data tables relating to annotating a multimedia presentation in accordance with one embodiment.
Figure 7C:
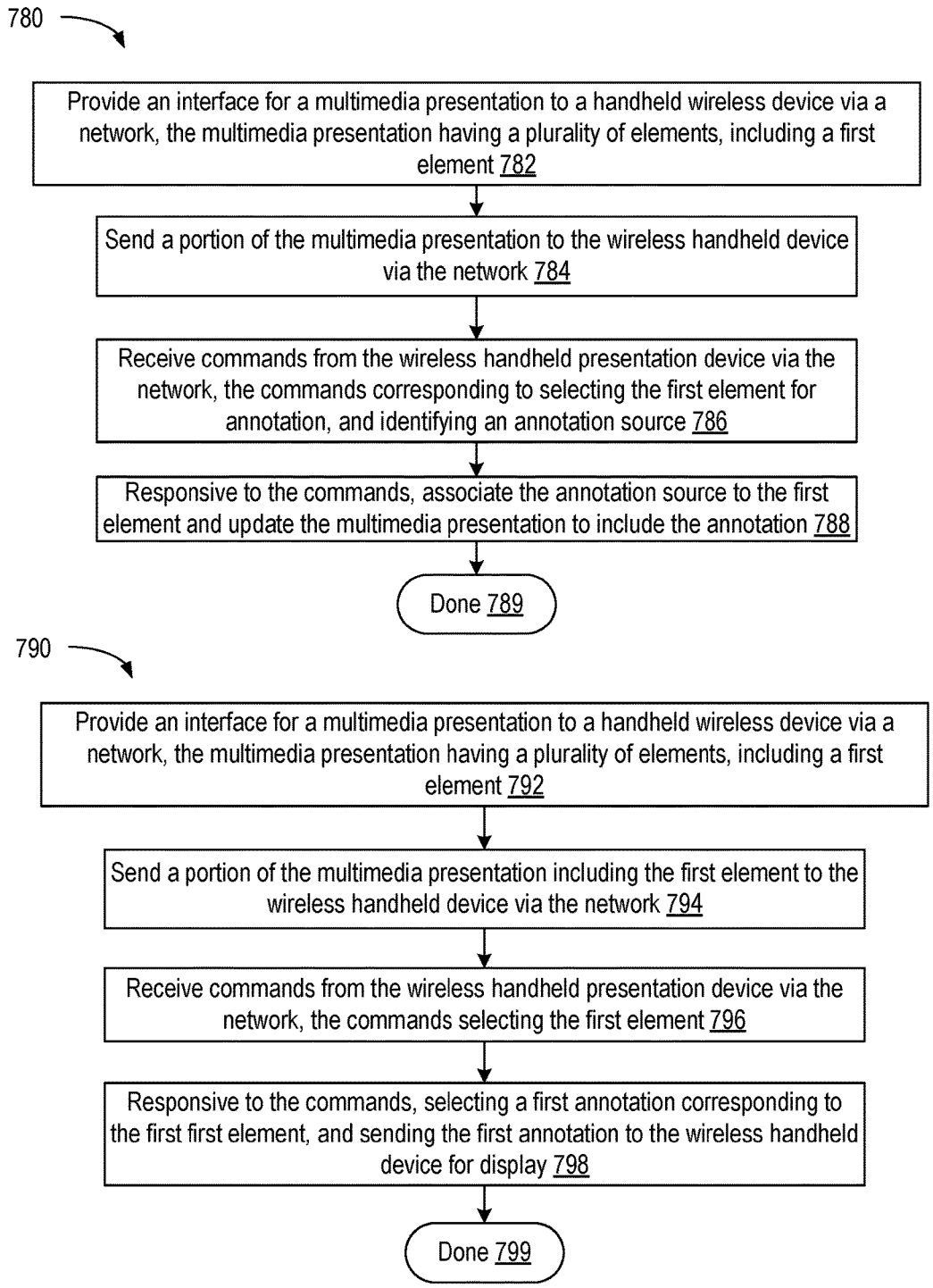
FIG. 7C sets forth flowcharts depicting methods for annotating a multimedia presentation in accordance with one embodiment.

Exemplary apparatuses including repositories for annotations and associations between annotations and multimedia presentations, and methods for annotating multimedia presentations, are depicted in FIGS. 7A-7C. Any multimedia presentation may be annotated and stored by a presenter (155), a moderator (145), or an audience member (115, 125, 135), supported by document service 175, automated moderator service 183, presenter service 178, and audience service 180. A multimedia presentation may be annotated with any number of sources, including audio, video, audio and video, animations, various document types including, e.g., presentation slides and document pages, and annotations such as those described with respect to FIG. 8. Because a multimedia presentation may itself comprise one or more of the foregoing types, an annotated multimedia presentation may comprise, e.g., slides and video annotated by video, video annotated by slides, slides annotated by video, audio, and slides, slides annotated by slides, video annotated by video, and so forth.

Portions of a multimedia presentation depicted as slide group 701 annotated by two videos and a slide, and slide group 710 annotated by audio and a document, are shown in FIG. 7A. Slide group 701 depicts a group of slides 701*a-c* for presentation to various audiences. An additional slide 701*d* serves as a repository for annotations that may be applied to group 701, including annotations for any of slides 701*a-c*. Annotation elements 721 (video), 722 (video), and 723 (slide) are arranged on slide 701*d* in locations relative to where each will actually appear on an annotated slide. Presenter support service 178, and audience support service 180, respectively enable a presenter or moderator, and an audience member, to conveniently arrange annotations such as elements 721, 722, and 723 on a dimension, e.g., slide 701*d*. Annotation data, parameters, and specifications, including a program source (dimension to be annotated), annotation overlay locations, scaling, annotation source references, and annotation time sequencing, are stored in annotation table 724. Although table 724 is invisible to a user viewing a dimension, e.g., slide 701*d*, it is depicted for clarity of description as a visible element on slide 701*d* in FIG. 7A to illustrate that it, or a reference to it, is stored in relation to annotation slide 701*d*. Dimension (slide) 710*d* similarly depicts annotation elements 741 (audio), 742 (slide), and annotation table 743.

FIG. 7B depicts dimension and annotation tables, and exemplary portions of annotated multimedia presentations, in accordance with one embodiment. A dimension table identifies portions of a multimedia presentation, identifies dimensions in each portion, and associates one or more annotations with a dimension. Dimension table 740 references portions 701-703 and 710 of the multimedia presentation depicted in FIG. 7A. Each dimension referenced in table 740 is identified in "Dimensions" column 2, and annotations are identified in "Annotations" column 3. In this example, annotations are associated with a dimension by virtue of a reference in "Annotations" column 3. For example, to associate portion (slides) 701 to the annotations identified in annotation table 724, "d,724" is inserted in Annotations column 3 of row 1. Additional annotations, e.g., "e,791," are specified in Annotations column 3 in accordance with another embodiment. In dimension table 740, row 1 column 1 ("Portion") identifies multimedia presentation portion 701, row 1 column 2 ("Dimensions") identifies multiple dimensions comprised of dimensions a, b, c, and d (slides 701*a*—d), and row 1, column 3 ("Annotations") identifies dimension (layer) d (slide 701*d*) as a slide containing annotations. Portion 702 has only a single dimension (itself) and no annotation, denoted by "–" (null) in the Dimensions and Annotations columns. Portion 703 includes dimension 703a, and an annotation dimension, identified in the Annotations column as dimension "b." Annotation specifications corresponding to portion 703 are stored in row 1 of table 732. Row 4 similarly describes portion 710 and annotation elements 741 and 742 (rows 1 and 2 of table 743).

Annotation table 724 depicted in FIG. 7B includes columns "Pgm Src," "InsPt," "Overlay Loc," "Scale," "Annotation Source," "Start," "Dur," "XF," and "F/B," serving to identify portions of the multimedia presentation to be annotated, the annotation source, and data, parameters, and specifications for applying the annotation source to the multimedia presentation. Row 1 of table 724 corresponds to portion 701 of the multimedia presentation depicted in FIG. 7A. The "Pgm Src" column identifies dimension 701a (the top slide in FIG. 7A) as the program source, i.e., the item to be annotated. The "Annotation Source" column references the source that will annotate the program source. In this instance, document service 175 will retrieve cloud-based movie file (http://zoho.local/annot1.mov) and use it to annotate dimension 701a. The annotation will overlay dimension 701a at its location (100, 100), specified in the "Overlay Loc" column of dimension 701a. The location may be made with reference to any reference point on dimension 701a as will be appreciated by one of skill in the art. Here, (100, 100) locates the upper left hand corner of "annot1.mov" 100 units to the right and down, relative to the upper left corner of dimension 701a. The annotation will be scaled to 25% (0.25) of its original size as specified in the "Scale" column. The "F/B" column specifies whether the annotation appears as foreground, background, or transparent elements. Foreground and background annotations will respectively appear "in front of" and "behind" program source features. Transparent annotations (not shown), indicated by the letter "T" in the "F/B" column, allow underlying features to be visible through the annotation. The letter "F" in the "F/B" column of table 724 row 1 indicates "annot1.mov" will appear in front of dimension 701a features. An exemplary end result of "annot1.mov" annotating dimension 701a is depicted in the first slide 701a in sequence 760. Note the annotation (721) overlays and partially covers bar chart 762.

In some multimedia presentations, dimensions may include discrete elements, and there may be more than one annotation. The system and methods described herein provide a way to time and sequence multiple annotations appearing on a portion of a multimedia presentation. Timing and sequencing of annotations relative to presentation elements are provided in accordance with one embodiment. The "InsPt" column provides a way to trigger an annotation on the appearance of an element in a presentation. This advantageously provides granularity within a presentation. For example, a presenter may wish to display a first element (bar chart), cause that element to trigger a first annotation (a brief video clip), and then upon displaying a second element (a label corresponding to the bar chart), trigger a second annotation video. To illustrate, sequence 760 in FIG. 7B depicts a time sequence of three phases of multimedia presentation dimension 701a. In the first phase, the first element, a bar chart 761, is displayed and has triggered a first animation 721, which overlays the bar chart. The second element, label 762 ("Subscriptions"), is not yet displayed as indicated by the dashed rectangle in the slide. In the second phase, label 762 appears, triggering a second animation 722, which partially overlays label 762 at location (400, 100), and at 25% of native scale as specified in the "Overlay Loc" and "Scale" columns of table 724 row 2. To trigger animations 721 and 722, the "InsPt" column of table 724 at row 1 is loaded with the number "1" (corresponding to element 1 of dimension 701a), and row 2 is loaded the number "2" (corresponding to element 2 of dimension 701a).

Additional timing granularity in the triggering and scheduling of annotations is provided by defining "Start," "Duration," and "XF" (crossfade) times for each annotation, as shown in table 724. The "Start" value defines a time interval between a trigger and the start of an annotation play. In the example of table 724, annotation "annot1.mov" is triggered when the first element of dimension 701a (bar chart 761) appears, however, the "Start" value of 3 delays the onset of "annot1.mov" until three (3) seconds after bar chart 761 appears. Similarly, "annot2.mov" is triggered when the second element of dimension 701a (label 762) appears. Because the "Start" value in row 2 is 0, however, "annot2.mov" fires immediately upon the appearance of the second element. A third annotation, http://zoho.local/annot3.pdf:2, is specified in table 724 row 3, referencing the second page of a pdf file (":2" indicating the second page). The number "−1" in the "InsPt" column indicates the third annotation triggers at the end of the second annotation. In this manner, annotations may be chained together. The "XF" column in row 3 is loaded with "−0.5," thereby causing the third annotation to fire one-half second before the end of the second annotation. An appropriate cross-fade algorithm is applied to fade out the second annotation as the third annotation begins to effectuate a smooth transition. Loading "XF" with a positive (rather than a negative) number introduces a delay (rather than a cross-fade) between annotations. In this example, loading XF with "0.5" introduces a one-half second delay between the second and third annotations.

Setting "InsPt" to "−" (dash or null), signals an annotation will trigger upon the appearance of a program source (in the present example, a dimension or slide of a multimedia presentation). In this instance, the "Start" value determines a time interval between the appearance of the dimension and the start of the annotation. Multiple annotations may be triggered on the appearance of a program source (here, a dimension), with actual start times determined by the "Start" value specified for each. In this example, the dimension is a slide, 703a. "InsPt" in table 732 is null ("−"), "Start" is loaded with the number "1," with a duration ("Dur") of 7 seconds. The annotation, "annot4.mov," therefore starts 1 second after the appearance of slide 703a and runs for seven (7) seconds. A second annotation (not depicted), for example a document page, is similarly specified in table 732 but with a "Start" value of 4. (The second animation may also be positioned at a different overlay location on slide 703a than the first animation.) The second annotation therefore starts four (4) seconds after the appearance of slide 703a, which is also three (3) seconds (4-1) after the start of, and during the first annotation. A presenter, moderator, or audience member is therefore afforded great flexibility in determining the timing and sequencing of annotations to multimedia presentations. As demonstrated above, the "Dur" value specifies the duration of an animation display. In the case of video or audio having a duration exceeding the "Dur" value, document service 175 fades the video or audio annotation upon reaching the specified duration ("Dur").

To recap, a presenter or moderator, or an audience member (supported respectively by presenter and audience support services 178 and 180), and automated moderator service 183, annotates a multimedia presentation by arranging annotations visually on a multimedia presentation dimension, e.g., slides 701d and 710d. Annotations may be created during live presentations, and at other times. For example, an audience member may record a "Q&A" discussion relating to an element of a slide during a live presentation. The annotated slide including the "Q&A" discussion is stored as a dimension of the multimedia presentation portion corresponding to the slide, in an account corresponding to the audience member. A presenter or moderator may similarly create and store annotations to multimedia presentations, during a presentation and at other times. Annotations are triggered upon the appearance of a program source which can be, e.g., audio, video, a dimension of a multimedia presentation including a slide, or upon the appearance of elements within a program source such as one or more bookmarks, or one or more elements within a slide, e.g., a graph or label text. When annotation parameters are not specified, default parameters are applied, e.g., multiple annotations relating to one portion are applied in left-to-right, top-to-bottom order with default scaling of 25% and five (5) second durations. Document support service 175, in cooperation with services 178, 180, and 183, manages program sources including dimensions, stores the annotations and related parameters (or references to them) in the dimensions, and manages related dimension and annotation tables. Annotations are stored within or external to the dimensions, e.g., in computer or "cloud" storage.

Sequence 760 in FIG. 7B depicts a seven (7) phase sequence for the display of slide dimensions 701d, 702, 703b, and 710d, making use of four (4) program sources, here, dimensions (slides) 701a, 702, 703a, and 710a, demonstrating the end result of applying annotations 721-723, 731, and 741-742 (depicted in dimensions 701d and 710d and specified in tables 724, 732, and 743), to the multimedia presentation depicted in FIG. 7A.

Phases 1-3 correspond to slide dimension 701d making use of slide 701a as the program source. Dimension table 740 references dimension 701d and annotation table 724 for annotations. The program source ("Pgm Src") to be annotated in phases 1-3 is dimension (slide) 701a, identified in column 1, rows 1-3 of table 724. In phase 1, the annotation is defined in row 1 of table 724. Annotation 721 ("annot1.mov") appears three (3) seconds ("Start"=3) after the first element, a bar graph (761), on slide 701a ("InsPt"=1) appears. The bar graph remains for 17 seconds ("Dur"=17). The second element of slide 701a, a label 762 indicated by a dashed rectangle, is not yet visible. Annotation 721 is in the foreground ("F/B"=F), sitting atop and partially covering bar graph 761 at overlay location (100, 100) ("Overlay Loc"=100,100), and scaled to 25% ("Scale"=0.25) of its native size.

In Phase 2, the annotation is defined in row 2 of annotation table 724. Annotation 722 ("annot2.mov") appears immediately ("Start"=0) upon the appearance of the second slide element, "Subscriptions" label 762, ("InsPt"=2) of slide 701a, and remains for five (5) seconds ("Dur"=5). Note that first annotation 721 is defined to have a 17 second duration. A presenter, moderator, or audience member, may override this duration simply by advancing to the second slide element, here, "Subscriptions" label 722. If the presentation is running in auto-play mode, however, the full 17 second duration corresponding to annotation 721 elapses before document support service 175 advances to the second element, which triggers second annotation 722. Annotation 722 is in the foreground ("F/B"=F), sitting atop and partially covering label 762 ("Subscriptions") at "Overlay Loc" (100, 400), and scaled to 25% ("Scale"=0.25) of its native size.

In Phase 3, the annotation is defined in row 3 of annotation table 724. Annotation 723 ("annot3.pdf:2") is page 2 (":2") of a pdf document. Its trigger point is set to occur after annotation 722 concludes ("InsPt"=-1), however because the cross-fade parameter ("XF"=-0.5) defines a one-half (0.5) second overlap, annotation 723 fires one-half second before the conclusion of annotation 722. It remains active for four (4) seconds ("Dur"=4) at "Overlay Loc" (600, 400), and is scaled to 20% ("Scale"=0.20) of its native size.

Phase 4 corresponds to slide 702. Dimension table 740 references no multimedia presentation dimension or annotation table, therefore slide 702, depicting a pie chart, simply displays sans annotation.

Phase 5 corresponds to slide dimension 703b making use of slide 703a as the program source. Dimension table 740 references dimension 703b and annotation table 732 for annotations. The program source ("Pgm Src") to be annotated is dimension (slide) 703a. A single annotation 731 ("annot4.mov") is defined in row 1 of table 732. This annotation is triggered by the slide itself ("InsPt"="–", or null) rather than by an element within a slide. It appears in the lower right corner of slide 703a ("Overlay Loc" (600, 600)), one (1) second ("Start"=1) after slide 703a appears, remains for seven seconds ("Dur"=7), and is scaled to 30% ("Scale"=0.30) of its native size.

The final two phases, 6-7, correspond to slide 710d making use of slide 710a as the program source. Dimension table 740 references dimension 710d and annotation table 743 for annotations. The program source ("Pgm Src") to be annotated in phases 6-7 is dimension (slide) 710a, identified in column 1, rows 1-2 of table 743. In phase 6, the annotation is defined in row 1 of table 743. Annotation 741 ("annot6.mp3") is an audio file, and therefore invisible. It starts to play three (3) seconds ("Start"=3) after the first element on slide 710a, the text "Mastery comes from being one with your work . . . " appears, and plays for five (5) seconds ("Dur"=5). A second annotation 742 ("annot7.pdf: 5"), page 5 (":5") of a pdf document, is defined in row 2 of table 743. The second annotation also triggers with reference to the first element ("InsPt"=1) of slide 710a. It appears ten (10) seconds after the first element on slide 710a appears, for a duration of ten (10) seconds ("Dur"=10) in the lower right corner ("Overlay Loc" 600, 700) of slide 710a. It is scaled to 20% ("Scale"=0.20) of its native size, and appears in the foreground ("F/B"=F), partially covering the slide text.

Annotating a multimedia presentation uses audio or video as a program source in accordance with another embodiment. In the example that follows, an audience member, e.g., member 115, focused handheld audience device 110 on herself and narrated annotations for the first two slides of the multimedia presentation depicted in FIG. 7A. This could have occurred during a live presentation of the multimedia presentation, or while playing a stored version of the multimedia presentation. Audience support service 180 enables audience member 115 to access the multimedia presentation, and in cooperation with document service 175, arranges for separate storage for the audience member, here member 115, under her own account. Notably, many audience members (and moderators and presenters), may simultaneously annotate multimedia presentations, limited only by system and storage capacity of their respective accounts. Document service 175, in cooperation with audience support service 180, may limit the number of annotations or storage allotments for users, including audience members, as desired, e.g., to conserve system resources as determined by a system administrator. This "narrative" type of annotation typically auto-plays in a sequence defined by an annotation table, with audio or video, e.g., relating to an audience member's narration, serving as the program source.

Sequence 765 in FIG. 7B depicts a two (2) phase sequence in which a movie created by an audience member, e.g., 115, ("http://zoho.local/audience_created.mov"), serves as the program source, annotated by dimensions from a multimedia presentation, here, slides 701a and 702 of the multimedia presentation shown in FIG. 7A. Phase 1 is defined in row 1 of annotation table 750. The program source to be annotated ("Pgm Src") is a movie clip, "audience_created.mov:00." The movie (clip 771 showing audience member 115) begins at zero seconds (":00"), and is annotated by "Annotation Source" dimension (slide) 701a. Slide 701a starts at the beginning ("Start"=0) of the movie, and remains for ten (10) seconds ("Dur"=10). Movie 771 and annotation (dimension) 701a appear side-by-side, with slide 701a positioned on the left of movie 771 ("Overlay Loc" set to −1), and is scaled to 120% ("Scale"=1.20) of its native size. Setting the table entry for "Overlay Loc" to "−2" (not shown) causes the annotation (dimension 701a) to appear to the right of movie 771 in accordance with another embodiment.

Phase 2 is defined in row 2 of annotation table 750. The program source to be annotated ("Pgm Src") is a second movie clip, "audience_created.mov:27." The second movie (clip 772 showing audience member 115) begins at 27 seconds relative to its beginning (":27"), and is annotated by "Annotation Source" dimension (slide) 702. Audience support service 175 automatically stamps the program source time (":27") when, during a presentation, the next portion, here slide 702, appears. Thus, while traversing the annotation table during auto-play, document service 175 launches the second movie clip at the appropriate time (:27) and the annotation sequence plays. In another embodiment, a different clip, e.g., "audience_created2.mov," may instead serve as a program source in row 2 of table 750. This allows a presenter, moderator, or audience member to advantageously edit an annotation at any time. The system seamlessly transitions by blending or cross-fading between movie clips as it traverses the annotation table during playback. Returning to the instant annotation example, annotation (dimension) 702 starts 12 seconds ("Start"=12) after movie clip 772 begins, and remains for ten (10) seconds ("Dur"=10). Scaling and location for this annotation (120%, annotation side-by-side to the left) are the same as for the first annotation.

Sequence 770 in FIG. 7B also depicts a two (2) phase sequence in which a movie created by an audience member, e.g., 115, ("http://zoho.local/audience_created.mov"), serves as the program source, annotated by dimensions from multimedia presentation slides 701a and 702 of the multimedia presentation shown in FIG. 7A. In this embodiment, however, annotations appear within, rather than alongside, the program source. For simplicity, only annotation parameters differing from those described in the "alongside" example above are described. Phase 1 is defined in row 1 of annotation table 755. Annotation source (dimension) 701a is scaled to 55% ("Scale"=0.55) of its native size, and is located at "Overlay Loc" (200, 300) of movie clip 771. Because "F/B" is set to "F," slide 701a is in the foreground of movie 771, partially covering the image of presenter 115. Phase 2 is defined in row 2 of annotation table 755, and specifies dimension 702 as the annotation source. Slide (dimension) 702 is scaled and positioned in the same locations as slide 701a, however, "F/B" is set to "B," indicating slide 702 is in the background. Accordingly, the image of presenter 115 depicted in movie 772 appears in front of and partially covers slide 702.

In another aspect, a movie clip includes one or more bookmarks, e.g., first, second, and third bookmarks at 15, 27, and 33 seconds into the clip. Specifying "InsPt" corresponding to the first bookmark, e.g., "1" corresponding to the bookmark at 15 seconds, provides for triggering an annotation source upon reaching the first bookmark at: 15 in accordance with one embodiment. An absolute time, e.g., "27" is specified as an "InsPt" in accordance with another embodiment, providing for triggering an annotation source when the movie playback reaches 27 seconds.

FIG. 7C sets forth flowchart 780 depicting a method for annotating a multimedia presentation in accordance with one embodiment. In step 782, an interface for a multimedia presentation is provided, e.g., via audience support service 180 or presenter support service 178, to a handheld wireless device, e.g., audience devices 115, 125, and 135, moderator device 140, and presenter device 150, via a network. A multimedia presentation, e.g., as depicted in FIG. 7A, includes a plurality of elements. For example, the presentation depicted in FIG. 7A includes portion 701 having dimensions a-d, dimension 701a including a first element (bar graph) and a second element ("Subscriptions") label. A portion of the multimedia presentation, e.g., portion 701a, is sent to the wireless handheld device via the network in step 784. Commands are received in step 786, e.g., by audience support service 180 or presenter support service 178, corresponding to selecting the first element, and identifying an annotation source, e.g., a narrative movie made by an audience member, presenter, or moderator. Responsive to the commands, e.g., by document service 175, the first element is associated with the annotation source, and the multimedia presentation is updated to include the associated annotation in step 788. The update to the multimedia presentation may include storing annotation information in a dimension, e.g., 701d, of the multimedia presentation. Annotation information may include annotation sources, e.g., ".mov" files, references to annotation sources stored elsewhere, e.g., in "cloud" storage, and annotation specifications or references to externally stored annotation specifications, e.g., in a database table or in "cloud" storage. At step 789, the method ends.

FIG. 7C also sets forth flowchart 790 depicting a method for playing an annotated multimedia presentation in accordance with another embodiment. In step 792, an interface for a multimedia presentation is provided, e.g., via audience support service 180 and presenter support service 178, to a handheld wireless device, e.g., audience devices 115, 125, and 135, moderator device 140, and presenter device 150, via a network. A multimedia presentation, e.g., as depicted in FIG. 7A, includes a plurality of elements. For example, the presentation depicted in FIG. 7A includes portion 701 having dimensions a-d, dimension 701a including a first element (bar graph) and a second element ("Subscriptions") label. A portion of the multimedia presentation, e.g., portion 701a, is sent to the wireless handheld device via the network in step 794. Commands are received in step 796, e.g., by audience support service 180 or presenter support service 178, corresponding to selecting the first element, e.g., by an audience member, presenter, or moderator. In step 798, responsive to the commands, a first annotation associated with the first element is selected, e.g., by document service 175, and sent to the wireless handheld device. At step 799, the method ends.

Figure 8:
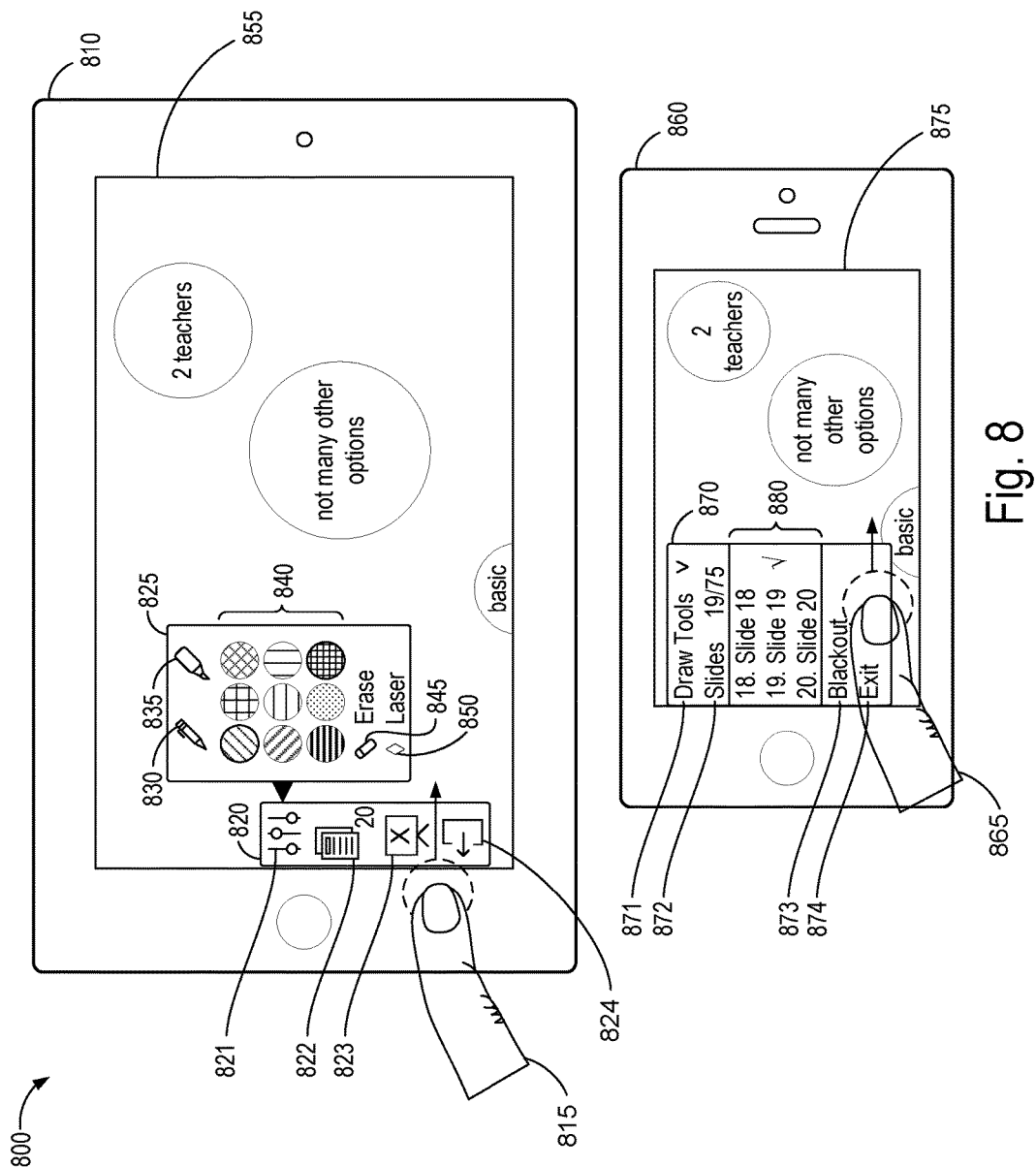
FIG. 8 depicts presentation tools in accordance with one embodiment.

FIG. 8 depicts presentation tools 800 in accordance with one embodiment. Presentation tools enable presenter 155 to update a multimedia presentation, including a portion of a multimedia presentation, in response to commands by, e.g., adding and removing features, annotating, drawing, sketching, writing, adding text, highlighting, and erasing. Updates made to a multimedia presentation are discarded by document management service 175 when viewing is complete, e.g., upon viewing a different portion, in accordance with one embodiment. Updates may be saved by document management service 175 upon or after concluding a presentation, in accordance with another embodiment. Updates are saved as one or more dimensions of a multimedia presentation in accordance with another embodiment, e.g., as described with respect to FIG. 7A. Saving updates advantageously enables re-use in future presentations. Presentation tools 800 may be used on a conventional computer, e.g., a desktop or laptop computer having any combination of, e.g., keyboard, mouse, touchscreen, and stylus. In another aspect, presentation tools may be used on any handheld wireless device, e.g., wireless handheld moderator device 140, wireless handheld presenter devices 150 and 160, or the presenter devices 810 and 860 depicted in FIG. 8, e.g., respectively an iPad and iPhone available from Apple, Inc., of Cupertino, Calif. Presenter device 810 includes screen 855, depicting a portion of a presentation, a side menu 820, and a submenu 825. Side menu 820 is activated by swiping 815 from the left edge of screen 855. In another embodiment, e.g., a laptop or desktop computer, a menu such as side menu 820, is activated via keyboard, e.g., by pressing Ctrl+Alt+M, or by activating an icon with, e.g., a mouse click or a stylus. Document management service 175 or presenter support service 178, in communication with a presenter device, e.g., presenter device 810, receives commands transmitted by device 810 and in response, updates one or more portions of the multimedia presentation, and displays the updates on one or more devices, e.g., presentation device 162, wireless handheld audience devices 110, 120, and 130, moderator device 140, and one or more presenter devices, e.g., devices 140, 150, 160, 810, and 860. In one embodiment, document management service 175 or presenter service 178 communicates with audience support service 180 for updating audience presentation devices, e.g., 110, 120, and 130.

Side menu 820 includes icons 821-824 corresponding to aspects of presentation tools. Activating drawing tools icon 821, e.g., by swipe, touch, keyboard, or mouse click, activates submenu 825, which includes annotation and drawing tools. A pencil tool 830 enables presenter 155 to write and draw on a presentation, e.g., the portion depicted on screen 855. A group of patterns and colors available in palette 840 (depicted without limitation in FIG. 8 as black and white line patterns in conformance with USPTO drawing standards), may be selected by, e.g., touch, mouse click, or stylus, and applied to pencil tool 830. One or more patterns or colors is similarly selected from palette 840 for application to highlighter 835. Annotations to a presentation by presenter 155 may therefore be made to a presentation in any arbitrary number and combination of colors and patterns. Presenter 155 may use highlighter tool 835 to annotate a presentation in an intuitive way.

Any portion of a presentation, including annotations, may be erased by selecting eraser tool 845. As noted above, document management service 175, presenter service 178, and audience support service 180, communicate with one another and with display devices to effectuate updating relevant displays in response to annotations made to the presentation with presentation tools 800. Selecting laser tool 850 activates an electronic pointer, e.g., a pointer formatted as a "laser" beam appearing, e.g., as a high intensity red dot. In another embodiment, a pointer is formatted in a different color or pattern selected, e.g., from palette 840, and a different shape, e.g., a diamond, arrow, or hand. In another embodiment, palette 840 is scrollable and includes icons defining shapes and animations for, e.g., a shape of an electronic pointer activated by laser tool 850, pencil tool 830, and highlighter tool 835. The electronic pointer is further described above with respect to FIG. 1. In another embodiment, presentation tools 800 include animating pencil tool 830, highlighter tool 835, and eraser tool 845. Transitions among portions of a presentation, e.g., while scrolling, beginning, and ending a presentation, and e.g., between blanking and un-blanking the presentation, may be animated by presentation tools 800 in another embodiment.

Activating portion select icon 822 enables presenter 155 to conveniently select a portion of the presentation. Portion select icon 822 identifies the portion currently displaying, here, portion 20, in one embodiment. Activating a blackout icon 823 (depicted as a TV screen with an "X" inside) turns off—blacks out, or "blanks"—the multimedia presentation by, e.g., shutting off display device 162 and, e.g., wireless handheld audience devices 110, 120, and 130. In one embodiment, blanking is accomplished via, e.g., a blank screen or a blank portion, e.g., a blank slide. Blackout tool 823 therefore advantageously enables presenter 155 to focus audience attention on the presenter, thereby enhancing communication with an audience. Activating exit tool 824 closes side menu 820 and submenus, e.g., submenu 825.

Wireless handheld presenter device 860 depicts presentation tools 800 in another embodiment, here, on a screen 875 smaller than the screen 855 described above. Side menu 870 is activated by swiping 865 from the left edge of screen 875. Similar to side menu 820, side menu 870 includes annotation tools 800. Item Drawing Tools 871 activates a drawing tools submenu (not depicted but similar in one embodiment to submenu 825). Side menu 870 as depicted enables presenter 155 to select a portion of a presentation. Item 872 indicates that portion 19 of 75 portions within the multimedia presentation is currently displaying. Portion 19 is also indicated by a check mark in a portion selection submenu 880. In one embodiment, portion selection submenu 880 scrolls, e.g., by swiping, allowing any portion, e.g., from portion 1 to portion 75, to be scrolled within the viewing window of submenu 880 and selected by, e.g., tapping the desired portion. Side menu 870 items Blackout 873 and Exit 874 respectively activate functions similar to blackout and exit tools 823 and 824 described above. The menus depicted in FIG. 8 are exemplary. Variations of these menus will be appreciated by one of ordinary skill in the art while remaining within the scope of the invention.

FIG. 9 depicts an exemplary view of a user interface on a wireless handheld client device 950, displaying information and presentation views of a conference in accordance with one embodiment. Client device 950 includes screen 955 and may be, e.g., an iPhone or iPad provided by Apple, Inc. of Cupertino, Calif. Audience support service 180 provides a configurable view of a series of multimedia presentations in connection with a conference event. Conference window 905 identifies three tracks (a track typically relates to a certain subject area, e.g., CRM), here, Tracks 1-3 correspond to "CRM," "Financials," and "Campaigns." One or more tracks may run in parallel within a conference, e.g., overlapping or concurrently. Within each track is a series of presentations, and within each presentation, slides. More generally, a slide is a portion of a multimedia presentation. Presentations appear in presentation order, thus, Presentation 1 occurs before presentation 2, and so forth. A conference or track "owner" may vary the order of presentations as will be described below with respect to FIG. 11.

A user may swipe 960 right or left to respectively open or close conference window 905. A first visual component in window 917 depicts a bar chart, "Slide 7," of Presentation 4 of Track 1 (CRM). Four smaller windows 913-916 display thumbnails indicating respectively slides 3-6 of Presentation 4. A user may touch any of windows 913-916 to view the corresponding slide in window 917 on demand. Typically, audience support service 180 displays only slides that have already been presented, however, this is not limiting and any slides within a presentation may be displayed. In other embodiments, more or fewer than four thumbnail windows are displayed on screen 955. A second visual component in window 935 depicts a pie chart, "Slide 5," of Presentation 1 of Track 3 (Campaigns). Windows 917 and 935 overlap in a "picture in picture" ("PIP") arrangement. Here, window 935 is depicted smaller than and overlapping window 917. Audience support service 180 responds to a user touching window 935 by swapping ("toggling") first and second visual components between windows 917 and 935 such that "Slide 7," originally appearing in window 917, appears in window 935, and "Slide 5," originally appearing in window 935, appears in window 917. A second touch to window 935 toggles the positions again. A user may view any slide or presentation merely by touching the appropriate slide or presentation entry in conference window 905. Touching an entry corresponding to a presentation, e.g., Presentation 4 of Track 1 (CRM), displays slide one of that presentation by default. Touching a slide within a presentation, e.g., Slide 7 of Presentation 4 of Track 1 (CRM), displays the slide, e.g., Slide 7, as depicted in FIG. 9.

FIG. 10 depicts an exemplary view of a user interface on a wireless handheld client device 1050, displaying information and presentation views of a conference in accordance with another embodiment. Certain items identified by reference numerals in FIG. 10 referring to similar elements in FIG. 9, e.g., screen 1050 of FIG. 10 to screen 950 of FIG. 9, were described with respect to FIG. 9 and are omitted here for brevity. Windows 1017 and 1035 appear in a non-overlapping "picture outside of picture" ("POP") arrangement. Although windows 1017 and 1035 are depicted to be approximately the same size, any size relationship between the two windows is arbitrary. Three thumbnail windows 1014-1016 appear below window 1017, and function in the same was as described with respect to windows 913-916. Thumbnail windows 1032-1034 function similarly with respect to window 1035.

Figure 11:
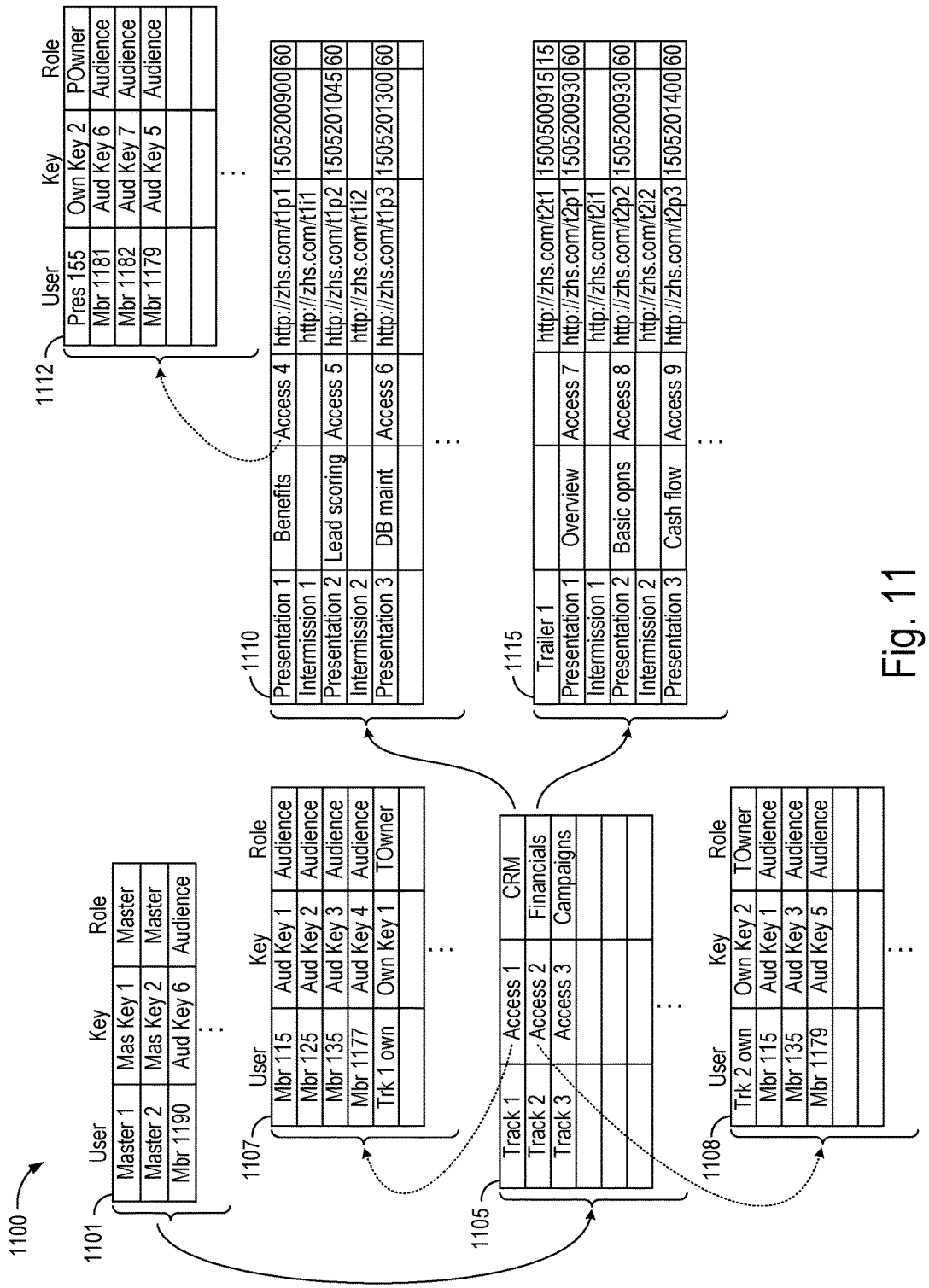
FIG. 11 depicts a view of a data structure for managing a master conference in accordance with one embodiment.

FIG. 11 depicts a view of an exemplary data structure for implementing a master conference in accordance with one embodiment. A conference may include a number of areas of distinct interest ("tracks"), or "parallel tracks," to audience members. One or more multimedia presentations may be presented within a track. Parallel tracks may overlap in time. For example, a first track might focus on Consumer Relationship Management ("CRM"). A first presentation within the first track might explore benefits of using CRM, and a second presentation might explain a specific CRM feature such as lead scoring. A third presentation might explain CRM database maintenance, and so forth. A second track, which may overlap in time relative to track 1, might focus on financial reporting tools, and contain a plurality of multimedia presentations specifically addressing subtopics. As the number of tracks and presentations grows, organizing and maintaining a multi-track, multi-presentation conference, and notifying conference attendees (audience members), presenters, and related support staff of last minute changes in scheduling and presentation order, can become challenging.

A master conference provides a way to organize and maintain continuity within a conference across a plurality of tracks and multimedia presentations. Data structure 1100 depicted in FIG. 11 is used by document management service 175 to coordinate presentations in several tracks. Data structure 1100 includes a plurality of tables that are expandable, thus, it supports an arbitrary number of tracks, presentations, users, user keys, and roles. Logically, a master conference may be thought of as a container holding constituent parts of the conference, including, e.g., tracks, presentations, and associations relating to scheduling and user access.

Document service 175 determines whether a user has access at the container level—the master conference as a whole—or to a lower level, e.g., portions of the conference, including tracks and presentations. Document service 175 references access tables, for example 1101 (master), 1107 and 1108 (track), and 1112 (presentation) in accordance with one embodiment, to determine what role, if any, a user attempting access to the conference may have. As depicted in FIG. 11, access tables 1101, 1107, 1108, and 1112 are set forth individually to facilitate understanding. Access data are located in a single access table in accordance with another embodiment, and may include one or more additional columns specifying tracks and presentations associated with a user.

Roles may be numerous and are not limited to those depicted in FIG. 11. For clarity of description, four roles are described with respect to FIG. 11. An "Audience" role grants a user access to view presentations. A "POwner" (presentation owner) role grants a user control over a specific presentation. The "POwner" may, e.g., view, copy, modify, add, delete, name, re-name, and present a presentation. The "POwner" may also generate a Trailer (see description above), and may associate a trailer with a presentation by, e.g., scheduling it to appear before the presentation. For example, "Trailer 1" could have been inserted in row 1 of table 1115 above Presentation 1 of Track 2 by a user having a "POwner" role with respect to that presentation. Similarly, the "POwner" may insert an intermission presentation, e.g., a delimiter slide or another trailer, after the presentation, e.g., "Intermission 1" depicted at table 1115, row 3, following "Presentation 1." The "POwner" role is superior to and includes all aspects of the "Audience" role.

A "TOwner" (track owner) role grants a user control over a specific track. The "TOwner" may, e.g., view, copy, modify, add, delete, name, re-name, schedule, re-schedule, order, re-order, presentations, and may schedule, re-schedule, re-order presentations. The "TOwner" role is superior to and includes all aspects of the "Audience" and "POwner" roles. A "Master" role grants a user container-level access, in other words, to the master conference as a whole. A "Master" has full control over all aspects of the master conference. For example, a "Master" may view, copy, modify, add, delete, name, re-name, schedule, re-schedule, order, re-order, tracks and presentations, and may schedule, re-schedule, re-order tracks and presentations. A "Master" may also, e.g., modify access tables and related data. The "Master" role is superior to and includes all aspects of the "TOwner," "POwner," and "Audience" roles.

Returning to master access table 1101, it identifies two master users in one embodiment, "Master 1" and "Master 2," corresponding keys (passwords) "Mas Key 1" and "Mas Key 2," and corresponding roles, "Master." Users "Master 1" and "Master 2" therefore have complete control (dominion) over the master conference. User names are not limited to those depicted here, "Master 1" and "Master 2," and may be arbitrary and in any form, e.g., BigDog, user001@gmail.com, and Sid@zohoshow.com. In one embodiment, document service 175 receives a user name and a key, e.g., "Master 1" and "Mas Key 1," authenticates the user, and determines with reference to table 1101 that "Master 1" has a "Master" role, entitling it to access the conference as a whole. Master 1 may therefore, e.g., schedule and reorder tracks and presentations, modify presentations, and add and remove users.

Presentation tables 1110 and 1115 are respectively associated with rows 1 and 2 of a track table 1105 (described below), corresponding to Tracks 1 and 2 of the master conference. Tables 1110 and 1115 define presentation ordering (column 1), display titling (column 2), reference to user access tables (column 3), reference to a presentation, e.g., live stream via URL (column 4), define a presentation date and starting time (column 5), and define a "lockout" period (column 6). Presentation 1 is indicated in table 1110 at row 1, column 1. Column 2 specifies its display title is "Benefits." Document service 175, via audience support service 180, may display "Benefits" from column 2, and other display titles identified in tables 1105 ("CRM," "Financials," "Campaigns," 1110 ("Benefits," "Lead Scoring," "DB maint", and 1115 ("Overview," "Basic opns") in, e.g., conference windows 905 and 1005 respectively of wireless handheld audience devices 950 and 1050. Column 3 "Access 4" references user access table 1112 (access tables corresponding to Access 5-9 are omitted for clarity), and column 4 references a location from which to retrieve Presentation 1, e.g., via URL, http://zhs.com/t1p1. The URL references a live stream during Presentation 1, and a recorded stream or file afterward in accordance with one embodiment. Column 5 specifies an estimated start time for Presentation 1 in YYMMDDHHMM format. As one of skill in the art may readily comprehend, any format specifying a start time may be used. The value in table 1110 corresponding to Presentation 1 is "1505200900," meaning May 20, 2015, 9:00 am. Column 6 specifies a lockout period. The lockout feature prevents a user having a superior role to "POwner" from modifying a presentation (here, Presentation 1) after the lockout period begins. This advantageously avoids surprising a presenter, e.g., presenter 155, with last minute changes by a well-meaning but perhaps distant master conference or track owner—or—by an automated process having the means to make real-time updates to a presentation prior to its instantiation, e.g., responsive to a customer data resource. The lockout period is specified in minutes in one embodiment. It is immediately adjacent to the estimated starting time of a presentation, e.g., the starting time of Presentation 1 specified in column 5 of table 1110.

For example, document 175 receives a request to modify Presentation 1. The request includes a user identity. Document 175 examines all roles relating to the user by referencing, e.g., access tables 1101, 1107, 1108, and 1112. If document service 175 determines the user identity includes a "POwner" role relating to Presentation 1, it moves forward with the modification. If document service 175 determines the role relating to Presentation 1 is a superior role to "POwner" relating to Presentation 1, e.g., "TOwner" of Track 1 or "Master," it subtracts the value in column 6 (60) from column 5 (1505200900), resulting in a lockout time that begins at 1505200800 (May 20, 2015, 8:00 am). It next reads current time from a real time clock (assumed always available via API or real time computer clock) and compares it to the lockout time. If the current time, e.g., 8:05 am, is later than the lockout time, document service 175 refuses to modify Presentation 1. If current time, e.g., 7:55 am is earlier than the lockout time, document service 175 proceeds to allow modification of Presentation 1. Notably, a user may be associated with a process, thereby enabling the lockout period relating to automated revisions to a presentation. For example, metadata service 490 may be applying modifications to, e.g., Presentation 1 in responsive to changes in audience composition via customer data service 194. The lockout period, applied to that service, would prevent real-time changes to the presentation after the lockout period begins. Notably, however, if it is desired for an automated process to work on a presentation in real time, the lockout period may be avoided simply by assigning the process a "POwner" role rather than a superior role.

A track table 1105 defines tracks in three columns identifying respectively a track, reference to a user access table, and a display name. Table 1105 depicts three parallel presentation tracks in column 1, "Track 1" through "Track 3," and corresponding display names in column 3, "CRM," "Financials," and "Campaigns." Column 2, referring to access tables, e.g., "Access 1," refers to table 1107, and "Access 2" refers to table 1108. (an access table corresponding to Access 3 is omitted for clarity) Document service 175 receives a user name and key, e.g., "Trk 1 own" and "Own Key 1," authenticates the user, and determines with reference to table 1107 at row 5 that "Trk 1 own" has role "TOwner." User "Trk 1 own" is therefore a track owner, specifically, of Track 1. Document service 175 will act on instructions it receives from a user having the "TOwner" role, here "Trk 1 own," to, e.g., schedule, re-schedule, re-order, view, copy, add, delete, rename, and modify presentations within any owned track, here, Track 1. For example, document service 175 receives instructions to swap the order of Presentations 1 and 2 in Track 1. In response, it copies the entries from table 1110 at row 1 corresponding to Presentation 1 to a temporary table (not shown), copies the entries from table 1110 at row 3 corresponding to Presentation 2 to row 1, thereby overwriting the entries corresponding to Presentation 1 with those corresponding to Presentation 2, and copies the contents of the temporary table to table 1110 at row 3, thereby overwriting the entries corresponding to Presentation 2 with those corresponding to Presentation 1. The swap has thus been effectuated.

In another aspect, document service 175 receives (via audience support service 180 because in this example, authentication involves an audience member) a user name and key, e.g., "Mbr 1177" and "Aud Key 4," authenticates the user, and determines with reference to table 1107 at row 4 that "Mbr 1177" has role "Audience," corresponding to an audience member. The Audience role enables a user to access (view) one or more presentations. Because user "Mbr 1177" is authenticated with respect to Track 1, she may access all presentations within Track 1, thereby advantageously avoiding the need to separately authenticate for each presentation. Similarly, "Mbr 1190," another audience member, authenticates at the master level in table 1101, and therefore may access (view) all presentations within all tracks.

In yet another aspect, one or more presentations may be accessed individually. Document service 175 authenticates audience member "Mbr 1179." User "Mbr 1179" appears in row 4 of access table 1108 corresponding to Track 2, thereby granting "Mbr 1179" access to all presentations within Track 2 (Financials). "Mbr 1179" also appears in row 4 of table 1112 corresponding to Presentation 1 of Track 1 (Benefits of CRM), thereby granting her viewing privileges to that presentation. Other combinations of tracks and presentations are possible. Accordingly, a conference provider may advantageously price, sell, and enforce tiers corresponding to, e.g., a whole conference, one or more tracks, and one or more individual presentations, in any arbitrary combination.

After a presentation is done, data and information relating to the presentation, e.g., customer data, any data not yet automatically stored as described above with respect to FIG. 1, are stored to, e.g., CRM. A presentation may be identified or declared to be "done" in a variety of ways. For example, upon reaching the final slide of, e.g., Presentation 1 (Benefits) of Track 1 (CRM), document service 175 displays "Intermission 1," which it retrieves from http://zhs.com/t2i1 in accordance with table 1115, row 3, column 4, and requests customer data service 194 to store information collected during Presentation 1. In another embodiment, presenter support service 178 receives a request from, e.g., presenter 155 to end the presentation. In yet another embodiment, document service 175 monitors a real time clock and compares it to the estimated starting time of a subsequent presentation, e.g., Presentation 2 of Track 2. If time is running short, e.g., the comparison yields, e.g., 30 minutes (defined in, e.g., a database table) or less, document service 175 transmits a request to presenter 155 through presenter support service 178 to end the presentation, and ends the presentation upon receiving a response from the presenter declaring the presentation to be "done."

In the foregoing description and in the accompanying drawings, specific terminology and drawing symbols are set forth to provide a thorough understanding of the present invention. In some instances, the terminology and symbols may imply specific details that are not required to practice the invention. For example, the wireless handheld devices discussed above are "smart phones" that support many services in addition to standard voice functions. Portable computing devices other than smart phones, such as tablet computers, e.g., an iPad manufactured by Apple, Inc. of Cupertino, Calif., and palm-top and lap-top computers, can be equipped as detailed herein to serve as wireless handheld devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art. More generally, the term "network" may refer to one or more networks of networks, in other words, one or more interconnected networks of various types such that a node, e.g., a client or server device, communicates via the network with another node. A network may include several types of networks, for example, private or public networks, local (LAN) and wide area (WAN) networks, wired, wireless, and cellular networks, and the Internet.

Figure 12:
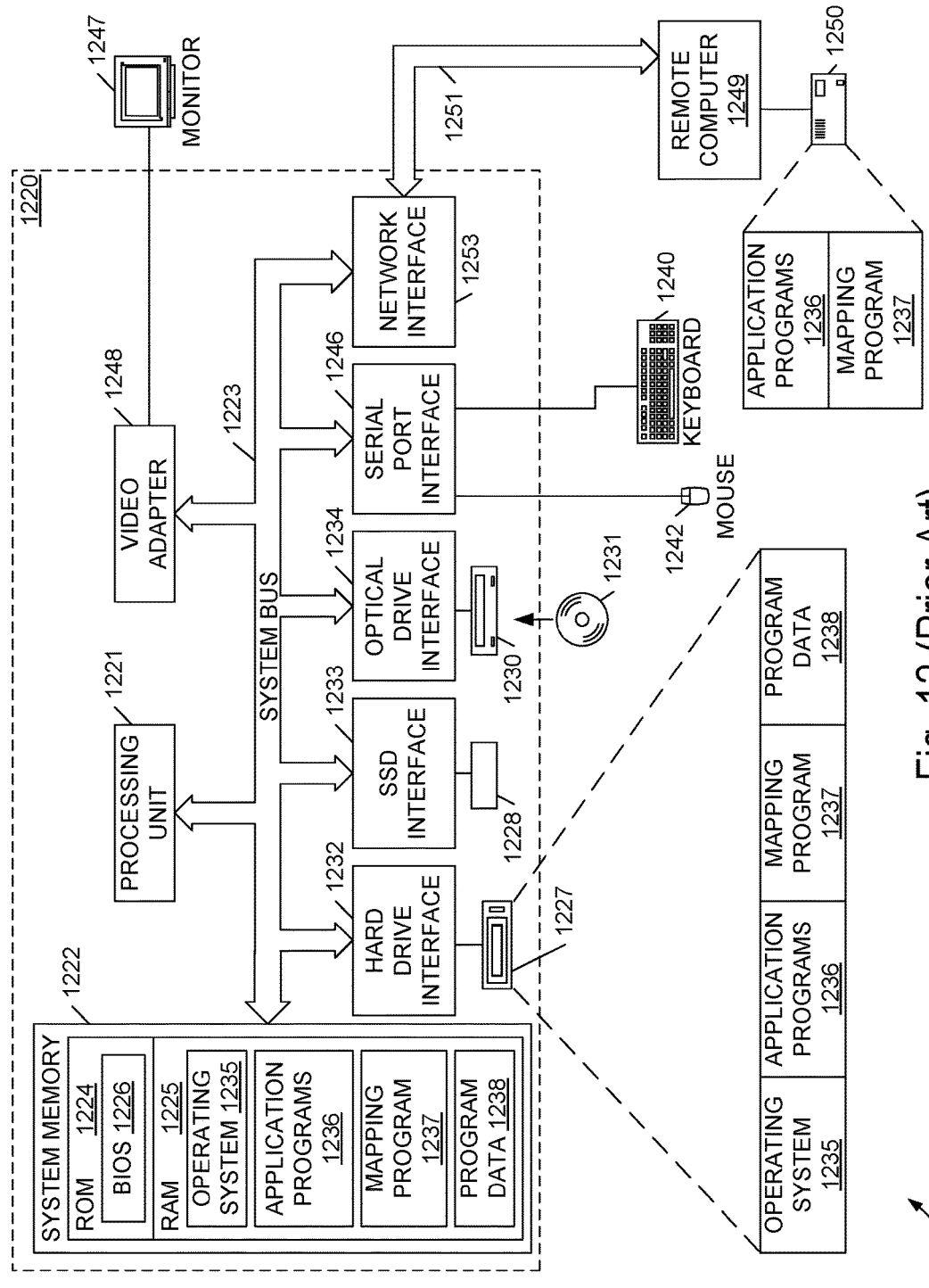
FIG. 12 depicts a prior art suitable computing environment in which the invention may be implemented.

FIG. 12 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform particular tasks or implement particular abstract data types. In a distributed computing environment, program modules may be located in both local and remote memory storage devices, and may be executed by client and server computers.

FIG. 12 depicts a general-purpose computing system 1200 that can serve as a client or a server depending on the program modules and components included. Those skilled in the art will appreciate that the invention may be practiced using other system configurations, including hand-held devices, multiprocessor systems, microprocessor-based or programmable consumer electronics, network PCs, mini-computers, mainframe computers, and the like.

Computing system 1200 includes a conventional computer 1220, including a processing unit 1221, a system memory 1222, and a system bus 1223 that couples various system components including the system memory to the processing unit 1221. The system bus 1223 may be any of several types of bus structures, including a memory bus or memory controller, a peripheral bus, and a local bus using any of a variety of bus architectures. The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224. The computer 1220 further includes a hard disk drive 1227 for reading from and writing to a hard disk, not shown, a solid-state drive 1228 (e.g. NAND flash memory), and an optical disk drive 1230 for reading from or writing to an optical disk 1231 (e.g., a CD or DVD). The hard disk drive 1227 and optical disk drive 1230 are connected to the system bus 1223 by a hard disk drive interface 1232 and an optical drive interface 1234, respectively. The drives and their associated computer-readable media provide nonvolatile storage of computer readable instructions, data structures, program modules and other data for computer 1220. Other types of computer-readable media can be used.

A number of program modules may be stored on the hard disk, solid state disk 1228, optical disk 1231, ROM 1224 or RAM 1225, including an operating system 1235, one or more application programs 1236, other program modules 1237, and program data 1238. A user may enter commands and information into the computer 1220 through input devices such as a keyboard 1240 and pointing device 1242. Other input devices (not shown) may include a microphone, joystick, game pad, satellite dish, scanner, or the like. These and other input devices are often connected to the processing unit 1221 through a serial port interface 1246 that is coupled to the system bus, but may be connected by other interfaces, such as a parallel port, game port or a universal serial bus (USB). A monitor 1247 or other type of display device is also connected to the system bus 1223 via an interface, such as a video adapter 1248. In addition to the monitor, computers can include or be connected to other peripheral devices (not shown), such as speakers and printers.

The computer 1220 may operate in a networked environment using logical connections to one or more remote computers, such as a remote computer 1249. The remote computer 1249 may be another computer, a server, a router, a network PC, a peer device or other common network node, and typically includes many or all of the elements described above relative to the computer 1220, although only a memory storage device 1250 has been illustrated in FIG. 12. The logical connections depicted in FIG. 12 include a network connection 1251, which can support a local area network (LAN) and/or a wide area network (WAN). Such networking environments are commonplace in offices, enterprise-wide computer networks, intranets and the Internet.

Computer 1220 includes a network interface 1253 to communicate with remote computer 1249 via network connection 1251. In a networked environment, program modules depicted relative to the computer 1220, or portions thereof, may be stored in the remote memory storage device. It will be appreciated that the network connections shown are exemplary and other means of establishing a communications link between the computers may be used.

Presentation Server 165 and Data Server 185 may be realized as one or more servers, each including one or more services shown within Presentation Server 165 and Data Server 185, e.g., services 175, 178, 180, 183, and 194. Presentation Server 165 and Data Server 185 may also be implemented as discrete servers in which each includes a processor, memory, storage, and modules, self-contained within a server having discrete physical boundaries. In this embodiment, communications among the processor, memory, storage, and modules, occur internally. A discrete server may also be embodied virtually, e.g., via VMWARE, or VIRTUALBOX. Presentation Server 165 and Data Server 185 may also be implemented in a distributed fashion, e.g., via a "hypervisor" implementation such as VMWARE, or as individual "cloud" services, in which processor, memory, and storage are not necessarily physically co-extensive. For example, processors 173 and 193 may be distributed across several physical processors communicating over a local area network. In such implementations, memories 170 and 190 may be physically separate from processors 173 and 193, and storages 184 and 195, and communicate over one or more network links. In one embodiment, a network link is potentially insecure. Some embodiments may therefore support secure links and data encryption for the communications into and out of Presentation Server 165 and Data Server 185. The components of servers 165 and 185 may be distributed across local and wide-area networks, including the Internet, as will be readily understood by those of ordinary skill in the art.

Methods and apparatus for enhancing multimedia presentations have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in some implementations with reference to user interfaces and particular hardware. Moreover, the technologies are disclosed above primarily in the context of multimedia presentations; however, the disclosed technologies apply to other data sources and other data types (e.g., collections of other resources, images, audio, web pages, etc.).

Reference in the specification to "some embodiments," "some implementations," "an embodiment," or "an implementation" means that a particular feature, structure, or characteristic described in connection with the embodiment or implementation is included in at least some embodiments or implementations of the disclosed technologies. The appearances of the phrase "in some embodiments," "in another embodiment," "in some implementations," or "in another implementation" in various places in the specification are not necessarily all referring to the same implementation or embodiment.

Some portions of the detailed descriptions above were presented in terms of processes or methods and symbolic representations of operations on data bits within a computer memory. A process or method can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The disclosed technologies may also relate to an apparatus for performing the operations or methods herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory, or any type of non-transitory media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modems, and Ethernet cards are just a few of the currently available types of network adapters.

Finally, the processes, methods, and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the descriptions herein. In addition, the disclosed technologies were not described with reference to any particular programming language. It will be appreciated that a variety of programming languages may be used to implement the teachings of the technologies as described herein.

The foregoing description of the implementations and embodiments of the present techniques and technologies has been presented for purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions, and/or formats. Furthermore, the modules, routines, features, attributes, methodologies, and other aspects of the present disclosure can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, and not limiting.

Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A computer-implemented method for electronically providing one or more electronic presentations corresponding to one or more multimedia presentations, the computer-implemented method comprising:

providing an audience interface to a wireless handheld audience device via a network wherein the audience interface is capable of rendering at least one electronic presentation;

receiving from the wireless handheld audience device, information relating to a first location corresponding to the wireless handheld audience device via the network, and in response, selecting a first multimedia presentation;

transmitting a portion of the first multimedia presentation to the wireless handheld audience device via the network;

receiving from the wireless handheld audience device, information relating to a second location corresponding to the wireless handheld audience device via the network, and in response, selecting a second multimedia presentation;

transmitting a portion of the second multimedia presentation to the wireless handheld audience device via the network;

rendering to the wireless handheld audience device a first electronic presentation comprising a first visual component corresponding to the first multimedia presentation, and a second electronic presentation comprising a second visual component corresponding to the second multimedia presentation;

associating the first visual component with a first display area on the wireless handheld audience device in response to receiving the information relating to the first location, and associating the first visual component with a second display area on the wireless handheld audience device in response to receiving the information relating to the second location, wherein the first and second display areas respectively have a first size and a second size;

associating the second visual component with the first display area on the wireless handheld audience device in response to receiving information relating to the second location; and receiving a command from the wireless handheld audience device, and responsive to the command, transposing the first and second sizes respectively between the first and second display areas.

2. The computer-implemented method of claim 1, wherein the first electronic presentation further comprises a first aural component corresponding to the first multimedia presentation.

3. The computer-implemented method of claim 1, wherein the first electronic presentation further comprises a first aural component corresponding to the second multimedia presentation.

4. The computer-implemented method of claim 1, wherein the first and second display areas overlap.

5. The computer-implemented method of claim 1, further comprising receiving a second command from the wireless handheld audience device, and responsive to the second command, transposing the first and second visual components respectively between the first and second display areas.

6. The computer-implemented method of claim 1, further comprising providing a presenter interface to a wireless handheld presenter device via the network, and transmitting an alert corresponding to the second location of the wireless handheld audience device to the presenter interface via the network.

7. The computer-implemented method of claim 1, further comprising associating data corresponding to the second location of the wireless handheld audience device with a customer data record.

* * * * *